US011419329B2

(12) United States Patent
Wright et al.

(10) Patent No.: US 11,419,329 B2
(45) Date of Patent: Aug. 23, 2022

(54) AGROCHEMICAL GEL COMPOSITIONS

(75) Inventors: Daniel R. Wright, St. Louis, MO (US); Xavier Belvaux, Fleurus (BE); Brian Midgley, Leuven (BE); William Abraham, Wildwood, MO (US)

(73) Assignee: Monsanto Technology LLC, St. Louis, MO (US)

( * ) Notice: Subject to any disclaimer, the term of this patent is extended or adjusted under 35 U.S.C. 154(b) by 0 days.

(21) Appl. No.: 13/634,093

(22) PCT Filed: Mar. 14, 2011

(86) PCT No.: PCT/US2011/028399
§ 371 (c)(1),
(2), (4) Date: Jan. 25, 2013

(87) PCT Pub. No.: WO2011/113061
PCT Pub. Date: Sep. 15, 2011

(65) Prior Publication Data
US 2013/0143741 A1 Jun. 6, 2013

Related U.S. Application Data

(60) Provisional application No. 61/313,216, filed on Mar. 12, 2010.

(51) Int. Cl.
*A01N 25/04* (2006.01)

(52) U.S. Cl.
CPC .................................... *A01N 25/04* (2013.01)

(58) Field of Classification Search
None
See application file for complete search history.

(56) References Cited

U.S. PATENT DOCUMENTS

| | | | |
|---|---|---|---|
| 2,441,729 A | 5/1948 | Steiner | |
| 2,909,462 A | 10/1959 | Warfield et al. | |
| 3,143,407 A | 8/1964 | Mitchell et al. | |
| 3,659,026 A | 4/1972 | Schuppner, Jr. | |
| 4,340,706 A | 7/1982 | Obayashi et al. | |
| 4,400,391 A | 8/1983 | Connick, Jr. | |
| 4,401,456 A | 8/1983 | Connick, Jr. | |
| 4,652,441 A | 3/1987 | Okada et al. | |
| 5,009,710 A | 4/1991 | Bewsey | |
| 5,017,620 A | 5/1991 | Grassman et al. | |
| 5,143,536 A | 9/1992 | Runkis | |
| 5,185,024 A | 2/1993 | Siemer et al. | |
| 5,196,044 A * | 3/1993 | Caulder et al. | 504/127 |
| 5,232,621 A | 8/1993 | Dixit et al. | |
| 5,341,932 A | 8/1994 | Chen et al. | |
| 5,443,835 A * | 8/1995 | Winston | 424/407 |
| 5,516,808 A | 5/1996 | Sawaya | |
| 5,643,584 A | 7/1997 | Farng et al. | |
| 5,674,511 A | 10/1997 | Kacher et al. | |
| 5,773,706 A | 6/1998 | Wesley et al. | |
| 5,824,075 A * | 10/1998 | Thielbar | 623/7 |
| 5,840,338 A | 11/1998 | Roos et al. | |
| 5,872,078 A * | 2/1999 | Kuchikata et al. | 504/206 |
| 5,912,009 A | 6/1999 | Venkateshwaran et al. | |
| 6,258,830 B1 | 7/2001 | Charu | |
| 6,336,977 B1 | 1/2002 | Menke et al. | |
| 6,380,135 B1 * | 4/2002 | Reuter et al. | 504/366 |
| 6,417,242 B1 | 7/2002 | Hughes et al. | |
| 6,436,439 B1 | 8/2002 | Landham et al. | |
| 6,649,190 B1 | 11/2003 | Tadros et al. | |
| 6,683,035 B1 | 1/2004 | Koester et al. | |
| 6,939,831 B1 | 9/2005 | Caminade et al. | |
| 7,179,483 B2 | 2/2007 | Ebert et al. | |
| 7,208,480 B2 | 4/2007 | Williams et al. | |
| 7,429,317 B2 | 9/2008 | Paul | |
| 7,455,832 B2 | 11/2008 | Birkel et al. | |
| 7,504,093 B2 | 3/2009 | Bracken et al. | |
| 2002/0192289 A1 | 12/2002 | Zheng et al. | |
| 2003/0108575 A1 | 6/2003 | Lu | |
| 2004/0063796 A1 | 4/2004 | Winston et al. | |

(Continued)

FOREIGN PATENT DOCUMENTS

| | | |
|---|---|---|
| AU | 1974066501 | 9/1975 |
| CN | 1093524 A | 10/1994 |

(Continued)

OTHER PUBLICATIONS

Chisholm, W.P., "Review of Aquatic Weed Control Methods in New Zealand," Aquatic Weed Control Ltd., Dunedin, NZ, 3 pages, Publication date: Sep. 24-28, 2006.
EPA Product Label Registration, "Aqua-Kil Plus", EPA Reg. No. 37347-6, Accepted Sep. 23, 1987, 7 pages.
"TumbleWeed" Photograph of Product Packaging, Copyright 2006, 1 page.
"TumbleWeed", Pan Pesticides Database-Pesticide Products, downloaded Feb. 15, 2013, www.pesticideinfo.org/Detail_Product.jsp?REG_NR=037347000068DIST_NR=6, 4 pages.
Product Label, "Spectracide," 2006, EPA Reg. No. 9688-244-8845, 4 pages.
International Search Report and Written Opinion issued in PCT/US2011/028399, dated Nov. 19, 2012, 10 pages.

(Continued)

*Primary Examiner* — Katherine Peebles
(74) *Attorney, Agent, or Firm* — Harness, Dickey & Pierce, P.L.C.

(57) ABSTRACT

Improved aqueous herbicidal compositions comprising at least one water-soluble herbicide and a gel forming agent are provided. The compositions are generally characterized as pseudoplastic, elastic and having a relatively high stationary viscosity. The compositions provide enhanced foliar retention and resistance to drying thereby allowing for improved uptake of the herbicide into the plants and/or translocation within the plant in order to more effectively kill the plants at reduced application rates in kilograms of herbicide per hectare, even in the absence of a surfactant. Methods for confined application of the compositions of the invention to control the growth of unwanted plants are also provided.

31 Claims, 8 Drawing Sheets

(56) References Cited

U.S. PATENT DOCUMENTS

| | | |
|---|---|---|
| 2006/0067963 A1 | 3/2006 | Bell |
| 2006/0177414 A1 | 8/2006 | Mertin et al. |
| 2007/0111896 A1 | 5/2007 | Knox et al. |
| 2008/0089857 A1* | 4/2008 | Huchet et al. .......... 424/84 |
| 2008/0248976 A1 | 10/2008 | Knox |
| 2008/0248977 A1 | 10/2008 | Knox |
| 2008/0255009 A1 | 10/2008 | Knox |
| 2009/0030102 A1 | 1/2009 | Nelles et al. |
| 2011/0210028 A1* | 9/2011 | Zhu .................. A01N 57/20 206/427 |

FOREIGN PATENT DOCUMENTS

| | | |
|---|---|---|
| EP | 0251464 A2 | 1/1988 |
| EP | 0430634 A1 | 6/1991 |
| EP | 0518689 A1 | 12/1992 |
| GB | 948185 | 1/1964 |
| GB | 970579 | 9/1964 |
| GB | 1047601 | 11/1966 |
| GB | 1395502 | 5/1975 |
| GB | 1430207 | 3/1976 |
| GB | 1506568 | 4/1978 |
| JP | 62201803 | 5/1987 |
| JP | 2001247843 A | 9/2001 |
| JP | 2001247845 A | 9/2001 |
| JP | 2001247847 A | 9/2001 |
| NZ | 214608 | 12/1986 |
| WO | 8702864 A1 | 5/1987 |
| WO | 8806888 A1 | 9/1988 |
| WO | 8904282 A1 | 5/1989 |
| WO | 9119481 A1 | 12/1991 |
| WO | 9201377 A1 | 2/1992 |
| WO | 9321763 A1 | 11/1993 |
| WO | 9325474 A1 | 12/1993 |
| WO | 96/03871 A1 | 2/1995 |
| WO | 96/03038 A1 | 2/1996 |
| WO | 9602239 A1 | 2/1996 |
| WO | 9913724 A1 | 3/1999 |
| WO | 0055275 A1 | 9/2000 |
| WO | 20030020412 A1 | 3/2003 |
| WO | 2008031870 A2 | 3/2008 |

OTHER PUBLICATIONS

Communication Pursuant to Rule 114(2) EPC issued in European Patent Application No. 11709307.0, dated Mar. 24, 2015, 2 pages.

Newfield, M.J., et al., VIGILANT® Herbicide for Control of Two Wilding Conifer Species, Contorta Pine and Douglas Fir, 2004, Weeds of the Environment, New Zealand Plant Protection 57:94-97.

Ward, B.G., et al., "Use of Herbicidal Gels on Woody Weeds," 2004, Doc Science Internal Series 162, Published by Department of Conservation, Wellington, New Zealand, 22 pages (ISBN 04-478-22549-0), 5-21, 22 pages.

Ward, B., et al., A Novel Herbicidal Gel technique for Controlling the Vine Celastrus orbiculatus (climbing Spindleberry), 2003, Plant Invasions: Ecological Threats and Management Solutions, Child et al., EDS., 331-336, 7 pages.

Ward, B.G., et al., "Eradication of Grey Willow (Salix cinerea) Using Herbicidal Gel Technology", 2002 Thirteenth Australian Weeds Conference, 488-491.

Ward, B.G., et al., "Controlling Key Environmental Weed Species Using Non-Spray Techniques," 2002, HortResearch Publication (ISBN 0-478-068 32-8), 32-38, 7 pages.

Ward, B.G., et al., "Herbicide Gels for Controlling Old Man's Beard (Clematis Vitalba) in Ecologically Sensitive Areas," 2000, New Zealand Plant Protection, 53:284-288.

Ward, B.G., et al., "Non-Spray Methods to Control Invasive Weeds in Urban Areas," 1999, Proc. 52nd N.Z. Plant Protection Conference, 1-5.

Henzel, R., et al., "New Technology Reduces Summer Pruning," Oct. 1991, N.Z. Kiwifruit, 14-15.

Tanner, D., "PSA Research—Update," KVH Inc. & Zespr Group Limited, Oct. 2011, 8 pages.

Durrani, M.J., et al., Water-Swellable Polymers (Carbomer Resins), 1996, Polymeric Materials Encyclopedia, vol. 11 T-Z, Joseph C. Salamone, Ed., CRC Press, 8677-8683, 9 pages.

Lubrizol Technical Data Sheet, "Measurement and Understanding of Yield Value in Home Care Formulations," Jan. 2002, TDS-244, 3 pages.

Lubrizol Technical Data Sheet, "Carbopol® Aqua 30 Polymer, A Versatile Liquid Rheology Modifier for Surfactant-Based Household and I&I Applications," Dec. 29, 2009, TDS-739, 2 pages.

Currier, H.B., et al., "Foliar Penetration of Herbicides-Review and Present Status" 1959, Weeds, 7/2:195-213, JSTOR, Jun. 26, 2015, http://www.jstor.org/stagle/4040221?seq=, 13 pages.

VIGILANT™ Herbicide Gel, Notice of Registralion of Chemical Product and Approval of Label under Agvet Codes, Chemical Product No. 58396, RegisliaLion and Approval Date Aug. 18, 2004, Australian Pesticides and Veterinary Medicines Authority, 2 pages.

VIGILANT™ Herbicide Gel, Certificate of Registration issued to Dow AgroSciences (NZ) Ltd, No. P005198, Dated Aug. 8, 2012, New Zealand Food Safety Authority: Agricultural Compounds and Veterinary Medicines, 2 pages.

VIGILANT™ Product Brochure, Distributed by HortReasearch, Ruakura Research Centre, Private Bag 3123, East Street, Hamilton, NZ, copyright 2004, 2 pages.

VIGILANT™ Herbicide Gel, Material Safety Data Sheet, Product No. P005198, Cas No. 002545-60-0, Plant & Food Research, Rangahau Ahumara Kai, Updated Feb. 9, 2009, 7 pages.

VIGILANT™ Use: Guidelines for Community Groups, Auckland Regional Council Fact Sheet, Guidelines for Community Groups, Jul. 10, 2000, 3 pages.

Old Man's Beard, Clematis vitalba, Greater Wellington, The Regional Council, Biosecurity, Pest Plants, published Aug. 2004, GW/BIO-G-04/50, 2 pages.

Goodwin, J.W., Solid/Liquid Dispersions, Chapter 10, "The Rheology of Colloidal Dispersions," Edited by Tharwat F. Tadros, copyright 1987, Academic Press Inc., 14 pages.

Tadros, Tharwat F., Dr., Applied Surfactants, Principles and Applications, Copyright 2005, Wiley-VCH Verlag GmbH & Do, KGaA, Weinheim, pp. 494-499, 8 pages.

Tadros, Tharwat F., Dr., Colloids in Cosmetics and Personal Care, vol. 4, Chapter 1, "Colloid Aspects of Cosmetic Formulations with Particular Reference to Polymeric Surfactants," Copyright 2008, Wiley-VCH Verlag GmbH & Co., KGaA, Weinheim, Germany, pp. 1-3, 5 pages.

Tadros, Tharwat F., Dr., Rheology of Dispersions: Principles and Applications, Chapter 4, "Principles of Viscoelastic Behavior," copyright 2010, Wiley-VCH Verlag GmbH & Co., KGaA, Weinheim, Germany, pp. 65-84, 22 pages.

Tadros, Tharwat F., Dr., Rheology of Dispersions: Principles and Applications, Chapter 7, "Rheology Modifiers, Thickeners, and Gels," copyright 2010, Wiley-VCH Verlag GmbH & Co., KGaA, Weinheim, Germany, pp. 149-167, 21 pages.

* cited by examiner

AGROCHEMICAL GEL COMPOSITIONS

REFERENCE TO RELATED APPLICATIONS

This application is the United States National Stage Application of International Application No. PCT/US2011/028399, filed Mar. 14, 2011, and claims the benefit of U.S. Provisional Application Ser. No. 61/313,216, filed Mar. 12, 2010, the entire disclosures of which are incorporated herein by reference.

FIELD OF THE INVENTION

The present invention generally relates to aqueous gel compositions comprising at least one water-soluble agrochemical that are particularly useful in maximizing agrochemical uptake and/or translocation into treated plants and minimizing agrochemical loss to the environment, and to methods of confined application of the agrochemical.

BACKGROUND OF THE INVENTION

Agrochemicals, such as herbicides, are typically formulated as dilute aqueous tank mix formulations that are delivered to plant foliage in an over-the-canopy broadcast application. Problematically, a significant portion of the broadcast application either misses the target plant foliage or drips off the foliage after application. Further, prior art tank mix compositions dry quickly after foliage application thereby providing only a limited time period for pesticidal transfer into the plant. Consequently, inefficient pesticidal use and concomitant environmental contamination occur. Typically, less than about 10% of broadcast applied pesticide is actually taken up into the target plant, with the remainder constituting pesticide waste that remains in the field.

Thus, there is a need for agrochemical compositions and methods for application to plants thereof that provide enhanced agrochemical retention on plant foliage, increased efficiency in transfer of agrochemicals to the plants, and minimized agrochemical loss to the environment.

SUMMARY OF THE INVENTION

Among the various aspects of the present invention is the provision of gel compositions comprising at least one herbicide, the compositions providing significantly-enhanced retention times on plant foliage, minimum wastage of herbicide and an increase in the herbicidal component taken up by a plant.

Briefly, therefore, the present invention is directed to agrochemical gel compositions comprising from 0.1 to 5 percent by weight on an acid equivalent basis of a water-soluble agrochemical component comprising at least one water-soluble agrochemical, from 0.1 to 5 percent by weight of a polymeric gel forming agent component comprising at least one polymeric gel forming agent, and from 85 to 98 percent by weight water. The tan (delta) of the gel composition is less than 1 as measured by oscillation frequency sweep rheometric measurements between about 0.1 and about 600 rad/sec at 0.2 Pa and 1 Pa as measured using cone and plate viscometer method with a 60 mm 2° acrylic cone and plate at 20° C. The yield point of the gel composition is at least about 50 dyne/cm$^2$.

The present invention is further directed to a method for confined application of an agrochemical to plants, the method comprising applying the agrochemical gel composition to the plants.

The present invention is still further directed to a method of confined application of a water-soluble herbicide to unwanted plants, the method comprising applying a gel composition comprising a water-soluble herbicide to the unwanted plants.

The present invention is yet further directed to a method of confined application of a glyphosate herbicide to unwanted plants, the method comprising applying a gel composition comprising glyphosate herbicide to the unwanted plants.

The present invention is further directed to a method of confined application of a glufosinate herbicide to unwanted plants, the method comprising applying a gel composition comprising glufosinate, glufosinate-P, or a salt or ester thereof to the unwanted plants.

The present invention is further directed to a method of confined application of an ALS or AHAS inhibitor herbicide to unwanted plants, the method comprising applying a gel composition comprising at least one ALS or AHAS inhibitor herbicide to the unwanted plants.

The present invention is further directed to a method of confined application of an auxin herbicide to unwanted plants, the method comprising applying a gel composition comprising at least one auxin herbicide to the unwanted plants.

Other objects and features will be in part apparent and in part pointed out hereinafter.

DESCRIPTION OF THE PREFERRED EMBODIMENTS

Figure 1:
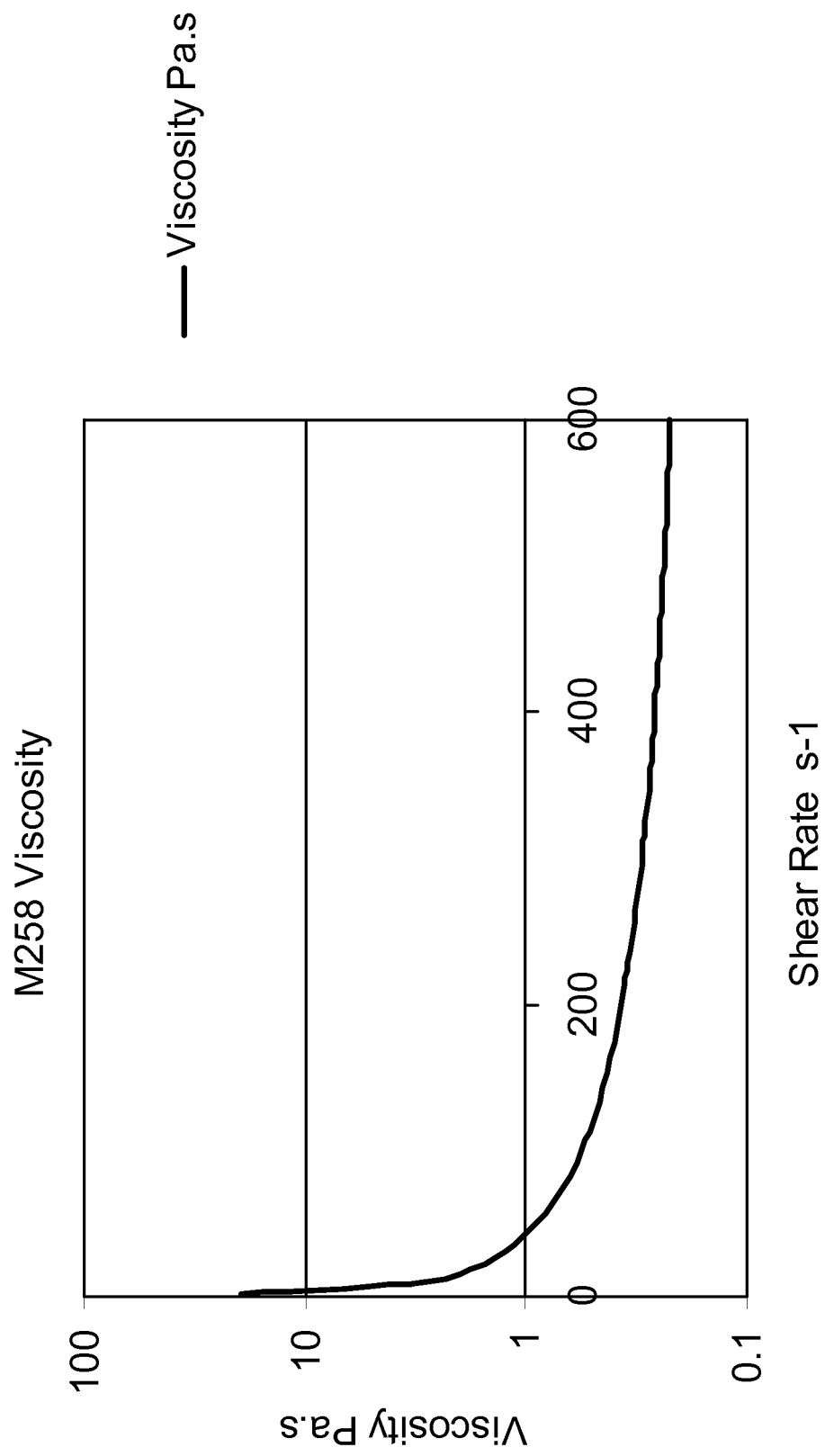
FIG. 1 is a graph depicting the viscosity of a glyphosate gel composition of the present invention as a function of shear rate. The data were obtained according to the method described in Example 1.

In accordance with the present invention, aqueous agrochemical gel compositions comprising at least one water-soluble agrochemical and at least one gel-forming agent for direct application to plant foliage are provided. The compositions are confined to and are retained on plant foliage for significantly longer periods than is typically characteristic of compositions known in the art, minimize loss of the agrochemical to the environment and maximize agrochemical contact time on the plant foliage. Moreover, the aqueous gels of the present invention retain water for an extended period of time as compared to tank mixes known in the art thereby providing enhanced agrochemical uptake into plants. High agrochemical (e.g., herbicidal) efficacy is achieved even in absence of a surfactant. The compositions of the present invention allow for selective and directed application to small areas, such as to individual plants, and are therefore particularly useful for lawns and gardens.

For purposes of the present invention, agrochemicals include herbicides, plant growth regulators, acaricides, insecticides, virucides, algicides, bactericides, fungicides, nematicides, herbicide safeners, plant activators and synergists, salts and esters thereof, racemic mixtures and resolved isomers thereof, and mixtures and combinations thereof. In some embodiments, the agrochemical is a pesticide such as a herbicide, insecticide, algicide, bactericide, fungicide or nematicide. Although reference is herein made to the herbicide glyphosate, one skilled in the art will understand that the principles of the present invention apply to agrochemicals in general, and the invention is not limited to glyphosate herbicidal compositions.

For broadcast applied herbicides, typically only 10% of the herbicide is transferred into the plant (i.e., uptake) after making contact with plant foliage. The combination of improved foliar retention and resistance to drying provided by the gel compositions of the present invention allow for greater than 10% uptake of the herbicide component in the gel composition into the plant including 15%, to as much as 50% uptake into the plant. Therefore, the gel compositions of the present invention allow for a more efficient uptake of the herbicide into the plants and/or translocation within the plant to more effectively kill the plants at reduced application rates in kilograms of herbicide per hectare.

The aqueous gel compositions of the present invention are preferably pseudoplastic, elastic and possess a relatively high stationary viscosity. The high stationary viscosity of the gel compositions of the instant invention facilitates the tendency of the gels to be retained on the plant foliage. The pseudoplastic nature of the gel compositions provides for low viscosity under elevated stress or shear conditions thereby enabling ease of application, for example, during pumping, spraying, brushing or roll-on application. The high stationary viscosity of the gels then returns under low or no stress (shear) conditions, such as after the compositions are applied to plant foliage. The elastic nature of the gels enhances retention on plant foliage. Embodiments of the present invention that do not comprise one or more water-insoluble agrochemicals are typically single phase or microemulsions. Embodiments of the present comprising one or more water-insoluble agrochemicals are typically two phase compositions including suspensions and emulsions.

In some embodiments, the compositions of the present invention comprise at least one water-soluble herbicide. For purposes of the present invention, water-soluble herbicides are defined as having a solubility of at least 1 gram per liter at 25° C. and water-insoluble herbicides are defined as having a solubility of less than 1 gram per liter at 25° C. Suitable water-soluble herbicides are selected from acetyl CoA carboxylase (ACCase) inhibitors, acetolactate synthase (ALS) or acetohydroxy acid synthase (AHAS) inhibitors, photosystem II inhibitors, photosystem I inhibitors, protoporphyrinogen oxidase (PPG or Protox) inhibitors, carotenoid biosynthesis inhibitors, enolpyruvyl shikimate-3-phosphate (EPSP) synthase inhibitors, glutamine synthetase inhibitors, dihydropteroate synthetase inhibitors, mitosis inhibitors, synthetic auxins, auxin transport inhibitors, nucleic acid inhibitors, and certain unclassified herbicides, and water-soluble derivatives thereof. In some embodiments, water-soluble herbicides are selected from ACCase inhibitors, ALS or AHAS inhibitors, photosystem II inhibitors, PPG inhibitors, carotenoid biosynthesis inhibitors, EPSP synthase inhibitors, dihydropteroate synthetase inhibitors, mitosis inhibitors, synthetic auxins, auxin transport inhibitors and nucleic acid inhibitors. For purposes of the present invention, derivatives of a herbicide include salts, esters, or compounds which are converted the herbicide in plant tissues or which otherwise provide the active herbicide or anions or cations thereof.

Examples of suitable water-soluble herbicides include, without restriction, 2,4-D, 2,4-DB, acifluorfen, aminopyralid, amitrole, asulam, azimsulfuron, beflubutamide, benazolin, bentazon, bispyribac-sodium, bromacil, carbetamide, carfentrazone-ethyl, chlorimuron-ethyl, chlorsulfuron, cinosulfuron, clopyralid, dicamba, dichlorprop, diclofop, diclopyr, difenzoquat, dimethenamid, dimethipin, diquat, DSMA, endothall, ethoxysulfuron, floramsulfuron, florasulam, flucarbazone-sodium, flumetsulam, fluoroxypyr, fosamine, glyphosate, glufosinate, glufosinate-P, halosulfuron-methyl, hexazinone, imazamethabenz-m, imazamox, imazapic, imazapyr, imazaquin, imazethapyr, iodosulfuron, MCPA, MCPB, mecoprop, mecoprop-P, MSMA, naptalam, nicosulfuron, paraquat, water-soluble, agronomically acceptable salts of fatty acids predominantly comprising $C_8$ to $C_{12}$ saturated, straight or branched chain fatty acids (e.g., water-soluble, agronomically acceptable salts of pelargonic acid), penoxsulam, picloram, primisulfuron-methyl, propoxycarbazone-sodium, prosulfuron, pyrithiobac-sodium, sethoxydim, sulfentrazone, sulfosulfuron, tebuthiuron, tepraloxydim, thifensulfuron-methyl, tralkoxydim, triasulfuron, tribenuron-methyl, triclopyr, trifloxysulfuron and triflusulfuron-methyl, agriculturally acceptable salts or esters of any of these herbicides, racemic mixtures and resolved isomers thereof, and mixtures and combinations thereof.

For the purposes of the present invention, "agriculturally acceptable salts" are generally defined as salts that provide desired solubility, bioefficacy, toxicity and environmental safety characteristics for the intended use. Typical cations for the herbicide salts of the present invention include, without restriction, sodium, potassium, monoethanolamine (MEA), dimethylamine (DMA), isopropylamine (IPA), trimethylsulfonium (TMS) diethylammonium (DEA), triethanolamine (TEA), diglycolamine (DGA), lithium, and ammonium. Typical anions for the formation of herbicide salts include, without restriction, chlorine, bromine, fluorine and acetate. Typical esters include, without restriction, methyl, ethyl, propyl, isopropyl, butyl, isobutyl, pentyl, isooctyl, ethylhexyl, ethoxyethyl, butoxyethyl, butoxypropyl and octanoate. Examples of resolved isomer herbicides include, without restriction, glufosinate-P and mecoprop-P. As used herein, where an herbicide or other agrochemical is referred to by name, such as glyphosate or glufosinate, it is understood that agriculturally acceptable salts, esters, resolved isomers and other derivatives of the agrochemical are included.

In some embodiments of the present invention, the water-soluble herbicide is selected from ALS or AHAS inhibitors, an EPSP inhibitor, a glutamine synthetase inhibitor, synthetic auxins, Photosystem I inhibitors, and combinations thereof. More particularly, the water-soluble herbicide can be selected from (i) synthetic auxins including 2,4-D, aminopyralid, clopyralid, dicamba, fluoroxypyr, mecoprop, mecoprop-P, picloram and triclopyr, (ii) the Photosystem I inhibitors diquat and paraquat, (iii) the EPSP inhibitor glyphosate, (iv) the glutamine synthetase inhibitor glufosinate and (v) ALS or AHAS inhibitors including imazamethabenz-m, imazamox, imazapic, imazapyr, imazaquin and imazethapyr, agriculturally acceptable salts or esters of any of these herbicides, racemic mixtures and resolved isomers thereof, and mixtures thereof. In some other embodiments, the water-soluble herbicide is glyphosate or a salt or ester thereof.

In some other embodiments of the present invention, the water-soluble herbicide is selected from ALS or AHAS inhibitors, an EPSP inhibitor, synthetic auxins, and combinations thereof. More particularly, the water-soluble herbicide can be selected from (i) synthetic auxins including 2,4-D, aminopyralid, clopyralid, dicamba, fluoroxypyr, mecoprop, mecoprop-P, picloram and triclopyr, (ii) the EPSP inhibitor glyphosate, and (iii) ALS or AHAS inhibitors including imazamethabenz-m, imazamox, imazapic, imazapyr, imazaquin and imazethapyr, agriculturally acceptable salts or esters of any of these herbicides, racemic mixtures and resolved isomers thereof, and mixtures thereof. In some preferred embodiments, the herbicidal gel compositions of the present invention including glyphosate or other systemic herbicide are free of certain contact herbicides (e.g., diquat and other bipyridyliums and diphenyl ethers) that may tend to undermine the systemic herbicides effectiveness by inducing too much damage to the foliar tissues of the plant after prolonged contact with the gel.

In some other embodiments, the water-soluble herbicide includes glyphosate or a salt or ester thereof. In some preferred embodiments, the herbicidal gel compositions of the present invention including glyphosate or a salt thereof are free of glofosinate and other active ingredients that may have a tendency to exhibit glyphosate antagonism.

In some embodiments of the present invention, the herbicide is glyphosate, or a salt or ester thereof and the compositions further comprise at least one water-soluble co-herbicide selected from one or more of ALS or AHAS inhibitors, a glutamine synthetase inhibitor and synthetic auxins. More particularly, in some water-soluble co-herbicide embodiments of the present invention, the co-herbicide combination includes glyphosate and glufosinate (hereinafter referring to both the racemic mixture and glufosinate-P); glyphosate and dicamba and/or 2,4-D; glyphosate and one or more of imazamethabenz-m, imazamox, imazapic, imazapyr, imazaquin and imazethapyr; glyphosate, glufosinate and dicamba and/or 2,4-D; glyphosate, glufosinate, and one or more of imazamethabenz-m, imazamox, imazapic, imazapyr, imazaquin and imazethapyr; glyphosate, glufosinate, dicamba and/or 2,4-D, and one or more of imazamethabenz-m, imazamox, imazapic, imazapyr, imazaquin and imazethapyr; or glyphosate, dicamba and/or 2,4-D, glufosinate, and one or more of imazamethabenz-m, imazamox, imazapic, imazapyr, imazaquin and imazethapyr.

In some other embodiments of the present invention, the herbicide is glyphosate, or a salt or ester thereof and the compositions further comprise at least one water-soluble co-herbicide selected from one or more of ALS or AHAS inhibitors and synthetic auxins. More particularly, in some water-soluble co-herbicide embodiments of the present invention, the co-herbicide combination includes glyphosate and dicamba and/or 2,4-D; glyphosate and one or more of imazamethabenz-m, imazamox, imazapic, imazapyr, imazaquin and imazethapyr; or glyphosate, dicamba and/or 2,4-D, and one or more of imazamethabenz-m, imazamox, imazapic, imazapyr, imazaquin and imazethapyr. In some other embodiments of the present invention, the herbicide is glyphosate, or a salt or ester thereof and the compositions further comprise at least one water-soluble, agronomically acceptable salt of a fatty acid predominantly comprising $C_8$ to $C_{12}$ saturated, straight or branched chain fatty acids (e.g., water-soluble, agronomically acceptable salts of pelargonic acid).

In some embodiments of the present invention, at least one water-insoluble herbicide may be optionally added to the gels. Examples of suitable water-insoluble herbicides include, without restriction, acetochlor, acifluorfen, aclonifen, alachlor, ametryn, anilofos, atrazine, azafenidin, benfluralin, bensulfuron-methyl, bensulide, benzofenap, bifenox, bromoxynil, butachlor, butroxydim, butylate, cafenstrole, chlomethoxyfen, chlorbromuron, chloridazon, chlornitrofen, chlorotoluron, chlorthal-dimethyl, chlorthiamid, cinmethylin, clethodim, clodinafop-propargyl, cloransulam-methyl, cyanazine, cycloate, cyclosulfamuron, cycloxydim, cyhalofop-butyl, desmedipham, desmetryn, dichlobenil, diflufenican, dimefuron, dimepiperate, dimethachlor, dinitramine, dinoterb, dithiopyr, diuron, EPTC, esprocarb, ethalfluralin, ethametsulfuron-methyl, ethofumesate, fenoxaprop-ethyl, fentrazamide, fluazifop-butyl, fluchloralin, flufenacet, flumiclorac-pentyl, flumioxazin, fluometuron, fluorochloridone, fluoroglycofen, flupyrsulfuron-methyl-sodium, fluridone, fluoroxypyr-1-methylheptyl, flurtamone, fluthiacet-methyl, fomesafen, foramsulfuron, furyloxyfen, haloxyfop-methyl, imazosulfuron, ioxynil, isoproturon, isoxaben, isoxaflutole, lactofen, lenacil, linuron, mefenacet, metazachlor, methabenzthiazuron, metobromuron, metolachlor, metosulam, metoxuron, metribuzin, molinate, monolinuron, napropamide, nitrofen, nitrofluorfen, norflurazon, oryzalin, oxadiargyl, oxadiazon, oxasulfuron, oxyfluorfen, pebulate, fatty acids predominantly comprising $C_8$ to $C_{12}$ saturated, straight or branched chain fatty acids (e.g., pelargonic acid), pelargonic acid, pendimethalin, phenmedipham, pretilachlor, prodiamine, prometon, prometryn, propachlor, propanil, propaquizafop, propisochlor, propyzamide, prosulfocarb, pyraflufen-ethyl, pyrazolynate, pyrazon, pyrazosulfuron-ethyl, pyrazoxyfen, pyridate, quinclorac, quinmerac, quizalofop-ethyl, rimsulfuron, siduron, simazine, simetryn, sulcotrione, sulfometuron, terbacil, terbumeton, terbuthylazine, terbutryn, thenylchlor, thiazopyr, thiobencarb, triallate, trietazine, trifluralin and vernolate, agriculturally acceptable salts or esters of any of these herbicides, racemic mixtures and resolved isomers thereof, and mixtures and combinations thereof.

In some embodiments of the present invention, the water-insoluble herbicide is selected from atrazine, diuron, acetochlor, alachlor, butachlor, dithiopyr, metazochlor, metolachlor (and S-metolachlor), pretilachlor, propachlor, propisochlor and thenylchlor, agriculturally acceptable salts or esters of any of these herbicides, racemic mixtures and resolved isomers thereof, and mixtures and combinations thereof.

In some other embodiments, the water-soluble herbicide is selected from 2,4-D, aminopyralid, clopyralid, dicamba, diquat, fluoroxypyr, glyphosate, glufosinate, glufosinate-P, mecoprop, mecoprop-P, imazamethabenz-m, imazamox, imazapic, imazapyr, imazaquin, imazethapyr, paraquat, picloram and triclopyr, and mixtures thereof and the water-insoluble herbicide is selected from atrazine, diuron, acetochlor, alachlor, butachlor, dithiopyr, metazochlor, metolachlor (and S-metolachlor), pretilachlor, propachlor, propisochlor and thenylchlor. In some other embodiments, the water-soluble herbicide is glyphosate and the water-insoluble herbicide is selected from one or more of atrazine, diuron, acetochlor, alachlor, butachlor, dithiopyr, metazochlor, metolachlor (and S-metolachlor), pretilachlor, propachlor, propisochlor and thenylchlor. The above-described water-soluble and water-insoluble herbicides include agriculturally acceptable salts or esters thereof, and racemic mixtures and resolved isomers thereof.

Regardless of the particular water-soluble herbicide, combination of water-soluble herbicides, or combinations of one or more water-soluble herbicides and at least one water-insoluble herbicide present in the aqueous gel compositions of the present invention, the total herbicide concentration is from about 1 to about 50 ("g a.e./L"), for example, from about 1 to about 30 g a.e./L, from about 5 to about 50 g.e./L), from about 5 to about 45 g a.e./L, from about to about 40 g a.e./L, from about 5 to about 35 g a.e./L, about to about 30 g a.e./L, from about 5 to about 25 g a.e./L, from about 5 to about 20 g a.e./L, or from about 5 to about 15 g a.e./L, in particular, 1, 5, 10, 15, 20, 25, 30, 35, 40, 45 or even 50 g a.e./L. Expressed alternatively, the concentration is most broadly from about 0.1 to about 5 percent by weight (wt %), from about 0.1 to about 3 wt %, from about 0.5 to about 5 wt %, from about 0.5 to about 4.5 wt %, from about 0.5 to about 4 wt %, from about 0.5 to about 3.5 wt %, from about 0.5 to about 3 wt %, from about 0.5 to about 2.5 wt %, from about 0.5 to about 2 wt %, or from about 0.5 to about 1.5 wt % on an acid equivalent basis. In the case of glyphosate in combination with one or more co-herbicides, the weight ratio of glyphosate to total co-herbicide, on an acid equivalent basis, is typically from about 10:1 to about 1:10, from about 5:1 to about 1:5, from about 3:1 to about 1:3 or from about 2:1 to about 1:2.

The compositions of the present invention have a total water content of from about 80 to about 98 percent by weight (wt %) water, from about 85 to about 98 wt % water, from about 90 to about 98 wt %, from about 94 to about 97.5 wt % water, from about 94 to about 98 wt % water, from about 95 to about 97.5 wt % water, or from about 95 to about 98 wt % water.

The gel forming agents for use in the instant invention are polymeric materials selected to achieve the rheological characteristics of the compositions of the present invention. The gel compositions of the present invention may be rheologically characterized by tan (delta), static or stationary viscosity, yield point and pseudoplasticity. Compositions of the present invention having a tan (delta) value in the preferred range will retain sufficient energy when a stress or strain is applied, for example by application methods such as rolling, brushing or passing the composition through a nozzle, to return to its previous condition and exhibit excellent stand-up when the stress or strain is removed. The compositions will also have a high cohesive property, namely, when a shear or strain is applied to a portion of the composition to cause it to flow, the surrounding portions will follow. As a result of this cohesiveness, the gel compositions of the present invention exhibit good retention on plant foliage and resist run-off. Moreover, the cohesiveness contributes to the physical (phase) stability of the gel compositions and resistance to phase separation of any undissolved suspended particles by providing a resistance to movement of the particles due to the strain exerted by a particle on the surround fluid medium. The gel forming agents are preferably hydrophilic.

Tan (delta) is expressed as G"/G' where G" is the viscous (loss) modulus and G' is the elastic (storage) modulus of the gel. By way of further explanation, the elastic (storage) modulus G' is a measure of the energy stored and retrieved when a strain is applied to the composition while viscous (loss) modulus G" is a measure to the amount of energy dissipated as heat when strain is applied. Expressed another way, G' is a measure of the ability of a composition to store recoverable energy. This energy storage can be the result of the ability of a complex polymer, structural network, or a combination of these to recover stored energy after a deformation. G" is a measure of the unrecoverable energy which has been lost due to viscous flow. A tan (delta) in the preferred range indicates that the elastic component of the gel predominates.

Tan (delta) can be measured by methods known to those skilled in the art. For instance, tan (delta) may be determined by using a mechanical spectrometer, such as model RMS-800, available from Rheometrics, Inc. in Piscataway, N.J., USA. In the evaluation, a disk-like composition sample, for example measuring about 2.5 mm in thickness and about 25 mm in diameter, is placed between opposed, axially spaced apart, radially-extending surfaces and the sample is in connection with each surface thereby filling a portion of the axial spacing between the surfaces. At a selected temperature (for instance 25° C.), one of the surfaces then is rotated about the axial direction relative to the other at a selected oscillating frequency (for instance one Radian per second) in order to place the test specimen under shear conditions. The torque resulting from the shear is measured. The shear may be steady shear, in which case the measured torque is constant, or the shear may be dynamic shear, in which case the measured torque changes continuously with time. The measured torque is proportional to the viscous, or loss component of the modulus (G") of the material. Typically, the shear is steady shear, meaning the measured torque, and thus G", is constant at the given temperature. As a result of the nature of the forces applied to the test specimen in this procedure, the test specimen has a tendency to expand axially, thereby placing axially directed forces upon the relatively rotating surfaces to which the specimen is coupled. This axial force exerted upon the surfaces by the test specimen under shear conditions is proportional to the elastic, or storage component of the modulus (G') of the material. The parameter tan (delta) is then calculated as G" divided by G' at the stated temperature and oscillating frequency. The gel compositions of the present invention preferably have a tan (delta) value of less than 1, less than 0.9, less than 0.8, less than 0.7, less than 0.6, less than 0.5, less than 0.4, or less than 0.3, for example, 0.9, 0.8, 0.7, 0.6, 0.5, 0.4, 0.3, 0.2, 0.1 or 0.05 and ranges thereof, such as from 0.05 to 0.9, from 0.05 to 0.8, 0.05 to 0.7, 0.05 to 0.6, 0.05 to 0.5, 0.05 to 0.4 or from 0.05 to 0.3.

In some embodiments of the present invention, tan delta is determined by oscillation frequency sweep rheometric measurements between about 0.1 and about 600 rad/sec at 0.2 Pa and 1 Pa as measured on a TA rheometer with a 60 mm 2° acrylic cone and plate at 20° C. G' and G" in Pa are measured and tan (delta) is calculated as G"/G'.

The compositions of the present invention preferably are pseudoplastic gels defined as having a viscosity that decreases with increasing shear rate (also termed shear thinning). Such gels exhibit a relatively low viscosity under high-shear conditions and a relatively high viscosity under low or no shear conditions. Consequently, the gels of the present invention have a high stationary viscosity (i.e. viscosity when not subjected to shear), but low viscosity when subjected to shear thereby resulting in a thin (low viscosity) solution that can be easily dispensed and applied to plant foliage, for example, as a fine spray or by direct application through, for instance, rolling or brushing. Stationary viscosity can also be termed "yield value" or "maximum viscosity" wherein each term refers to a measure of a gel's initial resistance to flow under shear. After application to plant foliage, a perfectly pseudoplastic gel regains all of its stationary viscosity in response to the absence of shear. The high stationary viscosity provides good foliage surface cling (inhibits dripping or flow of the compositions from non-horizontal leaf surfaces) and enhances the ability of the applied compositions to remain on the leaf after deposition, and not be dislodged or washed away from the surface during ordinary conditions of use.

Yield point is typically defined as the threshold shear stress that must be applied to induce flow of a fluid. The compositions of the present invention preferably have a yield point that allows for application of a flowable composition by mechanical methods having relatively low shear stress, such as by brushing or roll-on application, but is yet high enough to ensure that the gel is retained on the foliar tissues once the external stress is removed. The yield point of the gel compositions in accordance with the present invention is preferably at least about 50, 75, 100, 125, 150, 175, or at least about 200 dyne/cm$^2$, and ranges thereof, for example, such as from about 50 to about 400 dyne/cm$^2$, from about 50 to about 300 dyne/cm$^2$, from about 100 to about 400 dyne/cm$^2$ or from about 100 to about 300 dyne/cm$^2$. Like tan (delta), yield point for a gel composition can be readily measured using conventional equipment and methods known to those skilled in the art. Suitable means for determining yield point are set forth in Example 1.

In some embodiments of the invention, the gel compositions may exhibit some degree of thixotropy, i.e, the gels are not perfectly pseudoplastic, wherein viscosity is reduced by shear, as described above, but in contrast to a perfectly pseudoplastic liquid (which regains all of its stationary viscosity when the shear stress is removed), the viscosity of a thixotropic gel does not immediately return to its original value when the shear stress is removed. While pseudoplastic properties are the most desired for this invention, almost all compositions will exhibit some acceptable degree of thixotropy.

Viscosity of the gels of the present invention can be measured by methods known to those skilled in the rheological arts. For example, cone and plate-type viscometers as available from Rheometrics, Haake and Brookfield are suitable for viscosity measurement. Similarly, spindle-type viscometers as available from Haake or Brookfield can be used. For instance, stationary viscosity could be measured with a Brookfield RVT rotational viscosimeter fitted to a HELIPATH stand and with a TA spindle, at 1 r.p.m. and 25° C. In an optional method for measuring stationary viscosity of the pseudoplastic gels of the present invention, viscosity could be measured at varying shear rates. A zero-shear viscosity can be then be accurately estimated by linear regression of the collected viscosity versus shear data. A stationary viscosity measured as a function of shear rate (using, for instance, an AR 200 Advanced Rheometer (available from TA Instruments, Ltd.) with a 60 mm 2° acrylic cone and plate at 20° C. with an oscillating frequency of 100 rad/s) of greater than 2,000 mPa second is preferred, such as about 3,000, 4,000, 5,000, 10,000, 20,000, 30,000, 40,000, 50,000, 75,000, 100,000 or 150,000 mPa second. Viscosity ranges thereof, such as from about 2,000, 3,000, 4,000, 5,000, 10,000, 25,000 or 50,000 to about 150,000 mPa second, from about 2,000, 3,000, 4,000, 5,000, 10,000, 25,000 or 50,000 to about 100,000 mPa second, or from about 2,000, 3,000, 4,000, 5,000, 10,000, 25,000 to about 50,000 mPa second are preferred.

Gel forming agents of the present invention include: polyacrylic acids (CARBOPOL); polycarboxylic acids such as poly(1-carboxyethylene), carboxypolymethylenes prepared from acrylic acid cross-linked with allyl ethers of (polyalkyl)sucrose or pentaerythritol (such as CARBOPOL 940/941/980/981/1342/1382 and carbamer polymers such as carbomer 934P/974P); polyacrylamides; polyacrylates including CARBOPOL AQUA 30, sodium acrylate polymers (AQUAKEEP J-550/J-400) and alkyl acrylate polymers (PEMULEN); cellulose polymers such as hydroxypropyl cellulose (KLUCEL), hydroxypropylmethyl cellulose (KLUCEL HF, METHOCEL), hydroxypropylethyl cellulose, hydroxypropylbutyl cellulose, hydroxypropylpentyl cellulose, hydroxyethyl cellulose (NATROSOL), ethylcellulose, carboxymethyl cellulose, hydroxypropylmethyl cellulose phthalate, and cellulose acetate acrylic acid esters; alkoxybutyninpolymers such as polyoxyethylene-polyoxypropylene copolymers (available from BASF as the PLURONIC line); vinyl polymers such as but not limited to carboxyvinyl polymers, polyvinyl pyrrolidone, polyvinyl alcohol, polyvinyl methyl ether, polyvinyl ether, polyvinyl sulfonates, and mixtures or copolymers thereof; polyethylene compounds such as polyethylene glycol; polysaccharides such as polysucrose, polyglucose or polylactose, and salts thereof; polyethylene oxide polymers; poly(ethylene oxide)-co-poly(propylene oxide) block copolymers; poly (ethyloxazoline)polymers; gelatin succinate; natural gel forming agents including, gellan gum (available commercially as GELRITE, KELCOGEL and GELRITE), dextran, gaur-gum, tragacanth, xanthan gum, sodium pectinate, sodium alginate, acacia gum, Irish moss, karaya gum, guaiac gum and locust bean gum; natural high molecular weight compounds including proteins such as casein, gelatin, collagen, albumin; miscellaneous carbohydrates such as cellulose, dextrin, pectin, starches, agar and mannan; and mixtures thereof. These substances may be also be chemically derivatized (modified), e.g. esterified, etherified, hydrolyzed (e.g. sodium alginate, sodium pectinate, etc.) or salts thereof (e.g. sodium carboxymethyl cellulose). In some embodiments, the gel forming agent for use in the present invention includes polyacrylic acid (CARBOPOL), carboxylmethyl cellulose or CMC (COYOTE CMC-9000 from Gum Technology), polysucrose (KELZAN, Kelco Corp) or gellan gum.

Generally, the rheological characteristics of the compositions of the present invention vary depending on the identity of the gel forming agent, the identity and concentration of the water-soluble herbicide component, on the identity and concentration of the water-insoluble herbicide component (if present) and on the identity and concentration of a surfactant component (if present). The gel forming agent concentration, on an active basis, in the compositions of the present invention is from about 0.1 to about 5 wt %, from about 1 to about 5 wt %, from about 1 to about 4 wt % from about 1 to about 3 wt %, from about 2 to about 5 wt %, from about 2 to about 4 wt % or from about 2 to about 3 wt %. As used herein, the active basis concentration of a gel forming agent relates to the concentration of the active gel forming agent in the gel. For instance, CARBOPOL AQUA 30 polymer contains 30% by weight polymeric gel forming agent. Therefore, a composition of the present invention containing 10% by weight CARBOPOL AQUA 30 would have a gel forming agent concentration, on an active basis, in the composition of 3%. Similar calculations may be done for other gel forming agents that are within the scope of the present invention.

The rheological characteristics of some preferred gel forming agents of the present invention are affected by pH. For such pH-responsive gels, it is believed, without being bound to any particular theory, that gels are formed when the pH approaches the pKa of the pH-responsive gel forming compound. Stated differently, under one theory, it is believed that a pH-responsive gel reversibly forms in response to a change in the charging of the polymer chain, which is a chemical reaction where acidic or basic groups on the polymer are ionized or neutralized. For instance, compositions comprising polyacrylic acid gel forming agents will not form a gel at a pH of less than about 5. Composition viscosity rapidly increases at a pH of greater than about 7 and a gel is formed. The gel forming behavior of other gel forming agents, such as carboxylmethyl cellulose and polysucrose, is generally independent of pH.

The compositions of the present invention typically comprise one or more preservatives. Preservatives, when used, include, but are not limited to, biocides such mildewstats and bacteriostats. Examples include methyl, ethyl and propyl parabens; short chain organic acids (e.g. acetic, lactic and/or glycolic acids); bisguanidine compounds (e.g. Dantagard and/or Glydant); short chain alcohols (e.g. ethanol and/or IPA); 5-chloro-2-methyl-4-isothiazolin-3-one (KATHON GC), 2-methyl-4-isothiazolin-3-one (KATHON ICP), 5-chloro-2-methyl-4-isothiazolin-3-one (KATHON 886), all available from Rohm and Haas Company; 2-bromo-2-nitropropane 1, 3 diol (BRONOPOL), from Boots Company Ltd.; propyl-p-hydroxybenzoate (PROXEL CRL), from ICI PLC; 1,2-Benzisothiazol-3(2H)-one biocide (PROXEL GXL) from Zeneca Specialties Co.; o-phenyl-phenol, Na$^+$ salt (NIPASOL M) from Nipa Laboratories Ltd.; 1,2-Benzoisothiazolin-3-one (DOWICIDE A) and 1-(3-chloroallyl)-3,5,7-triaza-1-azoniaadamantane chloride (DOWICIL 75), from Dow Chemical Co.; quaternary alkyl ammonium chloride in 2-propanol (ARQUAD 2.8-50) from Akzo Nobel; and 2,4,4'-trichloro-2-hydroxydiphenylether (IRGASAN DP 200), from Ciba-Geigy A.G.

Based on experimental evidence to date, it has been discovered that the herbicidal performance of the gels of the present invention is not significantly affected by the presence of a surfactant. It is believed, without being bound to any particular theory, that the gels provide enhanced foliar contact time and a reduced drying rate thereby allowing efficient herbicide uptake an/or translocation even in the absence of a surfactant. In comparison, prior art liquid compositions do not effectively cling to the foliage and dry quickly. Consequently, a surfactant is typically required in such prior art compositions in order to provide rapid herbicide uptake before the composition drips off of the foliage and/or dries. Nonetheless, in some embodiments of the present invention, herbicidal efficacy enhancing surfactants known in the art can optionally be added to the gels. A weight ratio of herbicide, on an a.e. basis, to surfactant of from 1:1 to 20:1, from 2:1 to 10:1 or from 3:1 to 8:1 is preferred.

Alkoxylated tertiary etheramine surfactants for use in the herbicidal compositions of the present invention have the general structure (1):

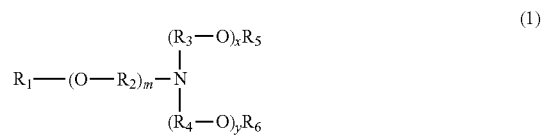

wherein $R_1$ is a hydrocarbyl or substituted hydrocarbyl having from about 4 to about 22 carbon atoms; $R_2$ is a hydrocarbylene having 2, 3, or 4 carbon atoms; m is an average number from about 1 to about 10; $R_3$ and $R_4$ are each independently hydrocarbylene having 2, 3, or 4 carbon atoms; $R_5$ and $R_6$ are each independently hydrogen or hydrocarbyl having 1 to 4 carbon atoms; and the sum of x and y is an average value ranging from about 2 to about 60.

$R_1$ is preferably an alkyl having from about 4 to about 22 carbon atoms, more preferably from about 8 to about 18 carbon atoms, from about 10 to about 16 carbon atoms, or from about 12 to about 18 carbons atoms, or from about 10 to about 14 carbon atoms. Sources of the $R_1$ group include, for example, coco or tallow, or $R_1$ may be derived from synthetic hydrocarbyls, such as decyl, dodecyl, tridecyl, tetradecyl, hexadecyl, or octadecyl groups. $R_2$ may be propylene, isopropylene, or ethylene, and m is preferably from about 1 to 5, such as 2 to 3. $R_3$ and $R_4$ may be ethylene, propylene, isopropylene, and are preferably ethylene. $R_5$ and $R_6$ are preferably hydrogen. The sum of x and y is preferably an average value ranging from about 2 to about 22, such as from about 2 to 10, or about 2 to 5. In some embodiments, the sum of x and y is preferably between about 10 and about 20, for example, about 15.

Specific alkoxylated tertiary etheramine surfactants for use in the herbicidal composition of the present invention include, for example, any of the TOMAH E-Series surfactants, such as TOMAH E-14-2 (bis-(2-hydroxyethyl) isodecyloxypropylamine), TOMAH E-14-5 (poly (5) oxyethylene isodecyloxypropylamine), TOMAH E-17-2, TOMAH E-17-5 (poly (5) oxyethylene isotridecyloxypropyl amine), TOMAH E-19-2, TOMAH E-18-2, TOMAH E-18-5 (poly (5) oxyethylene octadecylamine), TOMAH E-18-15, TOMAH E-19-2 (bis-(2-hydroxyethyl) linear alkyloxypropylamine), TOMAH E-S-2, TOMAH E-S-15, TOMAH E-T-2 (bis-(2-hydroxyethyl) tallow amine), TOMAH E-T-5 (poly (5) oxyethylene tallow amine), and TOMAH E-T-15 (poly (15) oxyethylene tallow amine). Another example is Surfonic AGM 550 available from Huntsman Petrochemical Corporation wherein, for formula (1), $R_{191}$ is $C_{12-14}$, $R_{192}$ is isopropyl, m is 2, $R_{193}$ and $R_{194}$ are each ethylene, and x+y is 5.

Alkoxylated quaternary etheramine surfactants for use in the herbicidal compositions of the present invention have the general structure (2):

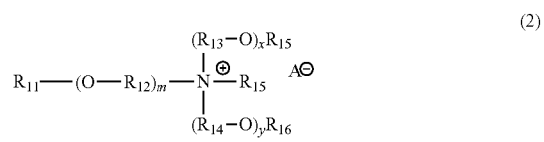

wherein $R_{11}$ is a hydrocarbyl or substituted hydrocarbyl having from about 4 to about 22 carbon atoms; $R_{12}$ is a hydrocarbylene having 2, 3, or 4 carbon atoms; m is an average number from about 1 to about 10; $R_{13}$ and $R_{14}$ are each independently hydrocarbylene having 2, 3, or 4 carbon atoms; $R_{15}$ and $R_{16}$ are each independently hydrogen or hydrocarbyl having 1 to 4 carbon atoms; and the sum of x and y is an average value ranging from about 2 to about 60. $R_{15}$ is preferably a hydrocarbyl or substituted hydrocarbyl having from 1 to about 4 carbon atoms, more preferably methyl. A is a charge balancing counter-anion, such as sulfate, chloride, bromide, nitrate, among others.

$R_{11}$ is preferably an alkyl having from about 4 to about 22 carbon atoms, more preferably from about 8 to about 18 carbon atoms, from about 10 to about 16 carbon atoms, or from about 12 to about 18 carbons atoms, or from about 12 to about 14 carbon atoms. Sources of the $R_{11}$ group include, for example, coco or tallow, or $R_{11}$ may be derived from synthetic hydrocarbyls, such as decyl, dodecyl, tridecyl, tetradecyl, hexadecyl, or octadecyl groups. $R_{12}$ may be propylene, isopropylene, or ethylene, and m is preferably from about 1 to 5, such as 2 to 3. $R_{13}$ and $R_{14}$ may be ethylene, propylene, isopropylene, and are preferably ethylene. $R_{15}$ and $R_{16}$ are preferably hydrogen. The sum of x and y is preferably an average value ranging from about 2 to about 22, such as from about 2 to 10, or about 2 to 5. In some embodiments, the sum of x and y is preferably between about 10 and about 20, for example, about 15.

Specific alkoxylated quaternary etheramine surfactants for use in the herbicidal composition of the present invention include, for example, TOMAH Q-14-2, TOMAH Q-17-2, TOMAH Q-17-5, TOMAH Q-18-2, TOMAH Q-S, TOMAH Q-S-80, TOMAH Q-D-T, TOMAH Q-DT-HG, TOMAH Q-C-15, and TOMAH Q-ST-50.

Alkoxylated etheramine oxide surfactants for use in the herbicidal compositions of the present invention have the general structure (3):

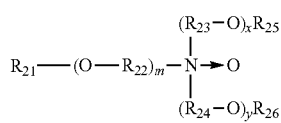

(3)

wherein $R_{21}$ is a hydrocarbyl or substituted hydrocarbyl having from about 4 to about 22 carbon atoms; $R_{22}$ is a hydrocarbylene having 2, 3, or 4 carbon atoms; m is an average number from about 1 to about 10; $R_{23}$ and $R_{24}$ are each independently hydrocarbylene having 2, 3, or 4 carbon atoms; $R_{25}$ and $R_{26}$ are each independently hydrogen or hydrocarbyl having 1 to 4 carbon atoms; and the sum of x and y is an average value ranging from about 2 to about 60.

$R_{21}$ is preferably an alkyl having from about 4 to about 22 carbon atoms, more preferably from about 8 to about 18 carbon atoms, from about 10 to about 16 carbon atoms, or from about 12 to about 18 carbons atoms, or from about 12 to about 14 carbon atoms. Sources of the $R_{21}$ group include, for example, coco or tallow, or $R_{21}$ may be derived from synthetic hydrocarbyls, such as decyl, dodecyl, tridecyl, tetradecyl, hexadecyl, or octadecyl groups. $R_{22}$ may be propylene, isopropylene, or ethylene, and m is preferably from about 1 to 5, such as 2 to 3. $R_{23}$ and $R_{24}$ may be ethylene, propylene, isopropylene, and are preferably ethylene. $R_{25}$ and $R_{26}$ are preferably hydrogen. The sum of x and y is preferably an average value ranging from about 2 to about 22, such as from about 2 to 10, or about 2 to 5. In some embodiments, the sum of x and y is preferably between about 10 and about 20, for example, about 15.

Specific alkoxylated etheramine oxide surfactants for use in the herbicidal composition of the present invention include, for example, any of the TOMAH AO-series of surfactants, such as TOMAH AO-14-2, TOMAH AO-728, TOMAH AO-17-7, TOMAH AO-405, and TOMAH AO-455.

Alkoxylated tertiary amine oxide surfactants for use in the herbicidal compositions of the present invention have the general structure (4):

(4)

wherein $R_{31}$ is a hydrocarbyl or substituted hydrocarbyl having from about 4 to about 22 carbon atoms, $R_{32}$ and $R_{33}$ are each independently hydrocarbylene having 2, 3, or 4 carbon atoms, $R_{34}$ and $R_{35}$ are each independently hydrogen or hydrocarbyl having 1 to 4 carbon atoms, and the sum of x and y is an average value ranging from about 2 to about 50.

$R_{31}$ is preferably an alkyl having from about 4 to about 22 carbon atoms, more preferably from about 8 to about 18 carbon atoms, and still more preferably from about 12 to about 18 carbons atoms, for example coco or tallow. $R_{31}$ is most preferably tallow. $R_{32}$ and $R_{33}$ are preferably ethylene. $R_{34}$ and $R_{35}$ are preferably hydrogen. The sum of x and y is preferably an average value ranging from about 2 to about 22, more preferably between about 10 and about 20, for example, about 15.

Specific alkoxylated tertiary amine oxide surfactants for use in the herbicidal compositions of the present invention include, for example, any of the AROMOX series of surfactants, including AROMOX C/12, AROMOX C/12W, AROMOX DMC, AROMOX DM16, AROMOX DMHT, and AROMOX T/12 DEG.

Alkoxylated tertiary amine surfactants for use in the herbicidal compositions of the present invention have the general structure (5):

(5)

wherein $R_{41}$ is a hydrocarbyl or substituted hydrocarbyl having from about 4 to about 22 carbon atoms, $R_{42}$ and $R_{43}$ are each independently hydrocarbylene having 2, 3, or 4 carbon atoms, $R_{44}$ and $R_{45}$ are each independently hydrogen or hydrocarbyl having 1 to 4 carbon atoms, and the sum of x and y is an average value ranging from about 2 to about 50.

$R_{41}$ is preferably an alkyl having from about 4 to about 22 carbon atoms, more preferably from about 8 to about 18 carbon atoms, and still more preferably from about 12 to about 18 carbons atoms, for example coco or tallow. $R_{41}$ is most preferably tallow. $R_{42}$ and $R_{43}$ are preferably ethylene. $R_{44}$ and $R_{45}$ are preferably hydrogen. The sum of x and y is preferably an average value ranging from about 2 to about 22, more preferably between about 10 and about 20, for example, about 15.

Specific alkoxylated tertiary amine surfactants for use in the herbicidal compositions of the present invention include, for example, Ethomeen T/12, Ethomeen T/20, Ethomeen T/25, Ethomeen T/30, Ethomeen T/60, Ethomeen C/12, Ethomeen C/15, and Ethomeen C/25, each of which are available from Akzo Nobel.

Alkoxylated quaternary amine surfactants for use in the herbicidal compositions of the present invention have the general structure (6):

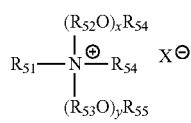
(6)

wherein $R_{51}$, $R_{52}$, $R_{53}$, x and y are as described above for the alkoxylated tertiary amine surfactants of structure (5), i.e., $R_{51}$ is a hydrocarbyl or substituted hydrocarbyl having from about 4 to about 22 carbon atoms, $R_{52}$ and $R_{53}$ are each independently hydrocarbylene having 2, 3, or 4 carbon atoms, $R_{54}$ and $R_{55}$ are each independently hydrogen or hydrocarbyl having 1 to 4 carbon atoms, and the sum of x and y is an average value ranging from about 2 to about 50. $R_{54}$ is preferably a hydrocarbyl or substituted hydrocarbyl having from 1 to about 4 carbon atoms, more preferably methyl. X is a charge balancing counter-anion, such as sulfate, chloride, bromide, nitrate, among others.

$R_{51}$ is preferably an alkyl having from about 4 to about 22 carbon atoms, more preferably from about 8 to about 18 carbon atoms, and still more preferably from about 12 to about 18 carbons atoms, for example coco or tallow. $R_{51}$ is most preferably tallow. $R_{52}$ and $R_{53}$ are preferably ethylene. $R_{54}$ and $R_{55}$ are preferably hydrogen. The sum of x and y is preferably an average value ranging from about 2 to about 22, more preferably between about 10 and about 20, for example, about 15. Specific alkoxylated quaternary amine surfactants for use in the herbicidal composition of the present invention include, for example, Ethoquad T/12, Ethoquad T/20, Ethoquad T/25, Ethoquad C/12, Ethoquad C/15, and Ethoquad C/25, each of which are available from Akzo Nobel.

An example of an alkoxylated polyamine surfactant for use in the herbicidal compositions of the present invention is a surfactant having the general structure (7):

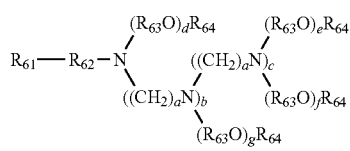
(7)

wherein $R_{61}$ is an alkyl or alkenyl radical containing 6 to 25 carbon atoms and from 0 to 3 carbon-carbon double bonds; $R_{62}$ is —OCH$_2$CH$_2$CH$_2$—, —C(=O)OCH$_2$CH$_2$—, —C(=O)NHCH$_2$CH$_2$CH$_2$—, or —CH$_2$—; each occurrence of $R_{64}$ is independently —H, —OC(=O)R$_1$, —SO$_3^-$A$^+$ or —CH$_2$C(=O)O$^-$A$^+$ wherein A$^+$ is an alkali metal cation, ammonium or H$^+$; each occurrence of a is from 3 to 8; each $R_{63}$ is independently ethyl, isopropyl or n-propyl; d, e, f and g are each independently from 1 to 20, b is from 0 to 10, c is 0 or 1, the sum of (c+d+e+f) is from (3+b) to 20, and the molecular weight is no more than about 800. The surfactants of formula (7) can optionally be in the form of a cation where one or more nitrogen atoms is additionally substituted with hydrogen, methyl, ethyl, hydroxyethyl or benzyl and one or more anions, equal in number to the number of said additionally substituted nitrogen atoms and being selected from chloride, methylsulfate and ethylsulfate. The surfactants of formula (7) can further optionally be in the form of amine oxides.

Examples of specific alkoxylated polyamine surfactants for use in the herbicidal composition of the present invention are described in described in U.S. Pat. No. 6,028,046 (to Arif). Alkoxylated polyamine surfactants include, for example, ethoxylates of Adogen 560 (N-coco propylene diamine) containing an average of from 2EO to 20EO, for example, 4.8, 10 or 13.4EO; ethoxylates of Adogen 570 (N-tallow propylene diamine) containing an average of form 2EO to 20EO, for example, 13EO; and ethoxylates of Adogen 670 (N-tallow propylene triamine) containing an average of from 3EO to 20EO, for example, 14.9EO all of which are available from Witco Corp.

Other polyamine surfactants for use in the herbicidal compositions of the present invention have the general structure (8):

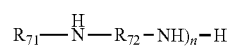
(8)

wherein $R_{71}$ is $C_{8-20}$, $R_{72}$ is $C_{1-4}$ and n is 2 or 3. Examples of polyamines for use in the compositions and methods of the present invention include Triamine C ($R_{71}$ is coco ($C_{10-14}$), $R_{72}$ is $C_3$, n is 2 and amine number (total mg KOH/g) is 500-525), Triamine OV ($R_{71}$ is oleyl (vegetable oil), $R_{72}$ is $C_3$, n is 2 and amine number (total mg KOH/g) is 400-420), Triamine T ($R_{71}$ is tallow ($C_{16-18}$), $R_{72}$ is $C_3$, n is 2 and amine number (total mg KOH/g) is 415-440), Triamine YT ($R_{71}$ is tallow ($C_{16-18}$), $R_{72}$ is $C_3$, n is 2 and amine number (total mg KOH/g) is 390-415), Triameen Y12D ($R_{71}$ is dodecyl ($C_{12}$), $R_{72}$ is $C_3$, n is 2 and amine number (total mg HCl/g is 112-122), Triameen Y12D-30 ($R_{71}$ is dodecyl ($C_{12}$), $R_{72}$ is $C_3$, n is 2 and amine number (total mg HCl/g is 335-365), Tetrameen OV ($R_{71}$ is oleyl (vegetable oil), $R_{72}$ is $C_3$, n is 3 and amine number (total mg KOH/g) is 470-500), Tetrameen T ($R_{71}$ is tallow ($C_{16-18}$), $R_{72}$ is $C_3$, n is 3 and amine number (total mg KOH/g) is 470-495), wherein each is available from Akzo Nobel.

Sulfate surfactants for use in the herbicidal compositions of the present invention have the general structure (9a-c):

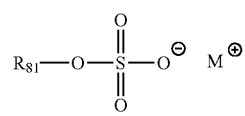
(9a)

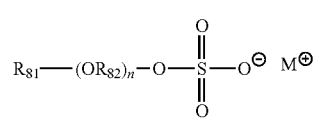
(9b)

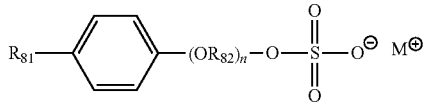
(9c)

wherein compounds of formula (9a) are alkyl sulfates, compounds of formula (9b) are alkyl ether sulfates and compounds of formula (9c) are alkyl aryl ether sulfates. $R_{81}$ is a hydrocarbyl or substituted hydrocarbyl having from about 4 to about 22 carbon atoms, each $R_{82}$ is independently ethyl, isopropyl or n-propyl and n is from 1 to about 20. M is selected from an alkali metal cation, ammonium, an ammonium compound or $H^+$. Examples of alkyl sulfates include sodium $C_{8-10}$ sulfate, sodium $C_{10-16}$ sulfate, sodium lauryl sulfate, sodium $C_{14-16}$ sulfate, diethanolamine lauryl sulfate, triethanolamine lauryl sulfate and ammonium lauryl sulfate. Examples of alkyl ether sulfates include sodium $C_{12-15}$ pareth sulfate (1 EO), ammonium $C_{6-10}$ alcohol ether sulfate (3 EO), sodium $C_{6-10}$ alcohol ether sulfate (3 EO), isopropylammonium $C_{6-10}$ alcohol ether sulfate (3 EO), ammonium $C_{10-12}$ alcohol ether sulfate (3 EO), sodium lauryl ether sulfate (3 EO). Examples of alkyl aryl ether sulfates include sodium nonylphenol ethoxylate sulfate (4 EO), sodium nonylphenol ethoxylate sulfate (10 EO), Witcolate™ 1247H($C_{6-10}$, 3EO, ammonium sulfate), WITCOLATE 7093 ($C_{6-10}$, 3EO, sodium sulfate), WITCOLATE 7259 ($C_{8-10}$ sodium sulfate), WITCOLATE 1276 ($C_{10-12}$, 5EO, ammonium sulfate), WITCOLATE LES-60A ($C_{12-14}$, 3EO, ammonium sulfate), WITCOLATE LES-60C ($C_{12-14}$, 3EO, sodium sulfate), WITCOLATE 1050 ($C_{12-15}$, 10EO, sodium sulfate), WITCOLATE WAQ ($C_{12-16}$ sodium sulfate), WITCOLATE D-51-51 (nonylphenol 4EO, sodium sulfate) and WITCOLATE D-51-53 (nonylphenol 10EO, sodium sulfate).

Sulfonate surfactants for use in the herbicidal compositions of the present invention correspond to sulfate structures (9a) through (9c) above except the R-substituted moiety is attached directly to the sulfur atom, for instance $R_{81}SO_3^-$. Examples of sulfonate surfactants include, for example, Witconate™ 93S (isopropylamine of dodecylbenzene sulfonate), WITCONATE NAS-8 (octyl sulfonic acid, sodium salt), WITCONATE AOS (tetradecyl/hexadecyl sulfonic acid, sodium salt), WITCONATE 60T (linear dodecylbenzene sulfonic acid, triethanolamine salt) and WITCONATE 605a (branched dodecylbenzene sulfonic acid, N-butylamine salt).

Phosphate esters of alkoxylated alcohol surfactants for use in the herbicidal compositions of the present invention have the general monoester structure (10a) and the general diester structure (10b):

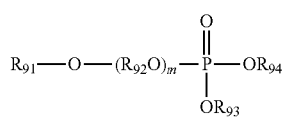
(10a)

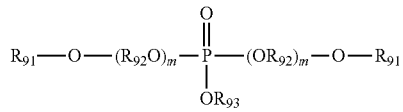
(10b)

wherein $R_{91}$ is a hydrocarbyl or substituted hydrocarbyl having from about 4 to about 22 carbon atoms; $R_{92}$ is a hydrocarbylene having 2, 3, or 4 carbon atoms; m is an average number from about 1 to about 60; and $R_{93}$ and $R_{94}$ are each independently hydrogen or a linear or branched chain alkyl having from 1 to about 6 carbon atoms.

$R_{91}$ is preferably an alkyl having from about 4 to about 22 carbon atoms, more preferably from about 8 to about 20 carbon atoms, or an alkylphenyl having from about 4 to about 22 carbon atoms, more preferably from about 8 to about 20 carbon atoms. Sources of the $R_{91}$ group include, for example, coco or tallow, or $R_{91}$ may be derived from synthetic hydrocarbyls, such as decyl, dodecyl, tridecyl, tetradecyl, hexadecyl, or octadecyl groups. $R_{92}$ may be propylene, isopropylene, or ethylene, and is preferably ethylene. m is preferably from about 9 to about 15. $R_{93}$ and $R_{94}$ are preferably hydrogen.

Specific phosphate esters of alkoxylated alcohol surfactants for use in the herbicidal composition of the present invention include, for example, EMPHOS CS-121, EMPHOS PS-400, and WITCONATE D-51-29, available from Witco Corp. Other examples are indicated in Table A below for the Phospholan produces (available from Akzo Nobel) wherein the surfactants may comprise a mixture of the monoester and diester forms and wherein $R_{94}$ is not present in the diester as indicated and "prop." refers to proprietary and "NR" refers to not reported. In some embodiments, the phosphate esters of the general monoester structure (10a) and the general diester structure (10b) are not alkoxylated, i.e., m is 0. Examples of commercial products include Phospholan PS-900 and Phospholan 3EA.

TABLE A

| Trade name | $R_{91}$ | $R_{92}$ | $R_{29}/R_{94}$ | m | mono and di forms |
|---|---|---|---|---|---|
| PHOSPHALAN CS-131 | nonyl phenol | $C_2$ | H | 6 | mono & di |
| PHOSPHALAN CS-1361 | nonyl phenol | $C_2$ | H | 6 | high mono & di |
| PHOSPHALAN CS-141 | nonyl phenol | $C_2$ | H | 10 | mono & di |
| PHOSPHALAN CS-147 | nonyl phenol | $C_2$ | H | 8 | mono & di |
| PHOSPHALAN KPE4 | prop. | prop. | prop. | prop. | mono |
| PHOSPHALAN PS-131 | tridecyl | $C_2$ | H | NR | NR |
| PHOSPHALAN PS-220 | decyl/tetradecyl | $C_2$ | H | 30 | mono & di |
| PHOSPHALAN PS-222 | dodecyl/ pentadecyl | $C_2$ | H | 3 | mono & di |
| PHOSPHALAN PS-236 | decyl/dodecyl | $C_2$ | H | 7 | mono & di |
| PHOSPHALAN PS-900 | tridecyl alcohol | — | H | — | mono & di |
| PHOSPHALAN TS-230 | phenyl | $C_2$ | H | 7 | mono & di |
| PHOSPHALAN 3EA | triethanolamine amine | — | H | — | mono |

Alkyl polysaccharide surfactants for use in the herbicidal compositions of the present invention have the general structure (11):

$$R_{101}\text{—O-(sug)}_u \quad (11)$$

wherein $R_{101}$ is a straight or branched chain substituted or unsubstituted hydrocarbyl selected from alkyl, alkenyl, alkylphenyl, alkenylphenyl having from about 4 to about 22 carbon atoms, wherein sug and u are as defined above. In various particular embodiments the polysaccharide surfactant may be an alkyl polyglucoside of formula (II) wherein: $R_{101}$ is a branched or straight chain alkyl group preferably having from 4 to 22 carbon atoms, more preferably from 8 to 18 carbon atoms, or a mixture of alkyl groups having an average value within the given range; sug is a glucose residue; and u is between 1 and about 5, and more preferably between 1 and about 3.

Examples of surfactants of formula (II) are known in the art. Representative surfactants are presented in Table B below wherein for each surfactant sug is a glucose residue.

TABLE B

| Trade name | $R_{101}$ | u |
|---|---|---|
| APG 225 | $C_{8-12}$ alkyl | 1.7 |
| APG 325 | $C_{9-11}$ alkyl | 1.5 |
| APG 425 | $C_{8-16}$ alkyl | 1.6 |
| APG 625 | $C_{12-16}$ alkyl | 1.6 |
| GLUCOPON 600 | $C_{12-16}$ alkyl | 1.4 |
| PLANTAREN 600 | $C_{12-14}$ alkyl | 1.3 |
| PLANTAREN 1200 | $C_{12-16}$ alkyl | 1.4 |
| PLANTAREN 1300 | $C_{12-16}$ alkyl | 1.6 |
| PLANTAREN 2000 | $C_{8-16}$ alkyl | 1.4 |
| AGRIMUL PG 2076 (synonymous with AGNIQUE PG 8105) | $C_{8-10}$ alkyl | 1.5 |
| AGRIMUL PG 2067 (synonymous with AGNIQUE PG 8107) | $C_{8-10}$ alkyl | 1.7 |
| AGRIMUL PG 2072 (synonymous with AGNIQUE PG 816) | $C_{8-16}$ alkyl | 1.6 |
| AGRIMUL PG 2069 (synonymous with AGNIQUE PG 9116) | $C_{9-11}$ alkyl | 1.6 |
| AGRIMUL PG 2062 (synonymous with AGNIQUE PG 264) | $C_{12-16}$ alkyl | 1.4 |
| AGRIMUL PG 2065 (synonymous with AGNIQUE PG 266) | $C_{12-16}$ alkyl | 1.6 |
| BEROL AG6202 | 2-ethyl-1-hexyl | |

Alkoxylated alcohol surfactants for use in the herbicidal compositions of the present invention have the general structure (12):

$$R_{111}O-(R_{112}O)_xR_{113} \qquad (12)$$

wherein $R_{111}$ is hydrocarbyl or substituted hydrocarbyl having from 1 to about 30 carbon atoms, $R_{112}$ in each of the $(R_{112}O)_x$ groups is independently $C_2$-$C_4$ alkylene, $R_{113}$ is hydrogen, or a linear or branched alkyl group having from 1 to about 4 carbon atoms, and x is an average number from 1 to about 60. In this context, preferred $R_{111}$ hydrocarbyl groups are linear or branched alkyl, linear or branched alkenyl, linear or branched alkynyl, aryl, or aralkyl groups. Preferably, $R_{111}$ is a linear or branched alkyl or linear or branched alkenyl group having from about 8 to about 30 carbon atoms, $R_{112}$ in each of the $(R_{112}O)_x$ groups is independently $C_2$-$C_4$ alkylene, $R_{113}$ is hydrogen, methyl or ethyl, and x is an average number from about 5 to about 50. More preferably, $R_{111}$ is a linear or branched alkyl group having from about 8 to about 25 carbon atoms, $R_{112}$ in each of the $(R_{112}O)_x$ groups is independently ethylene or propylene, $R_{113}$ is hydrogen or methyl, and x is an average number from about 8 to about 40. Even more preferably, $R_{111}$ is a linear or branched alkyl group having from about 12 to about 22 carbon atoms, $R_{112}$ in each of the $(R_{112}O)_x$ groups is independently ethylene or propylene, $R_{113}$ is hydrogen or methyl, and x is an average number from about 8 to about 30. Preferred commercially available alkoxylated alcohols include: EMULGIN L, PROCOL LA-15 (from Protameen);

BRIJ 35, BRIJ 56, BRIJ 76, BRIJ 78, BRIJ 97, BRIJ 98 and TERGITOL XD (from Sigma Chemical Co.); NEODOL 25-12 and NEODOL 45-13 (from Shell); HETOXOL CA-10, HETOXOL CA-20, HETOXOL CS-9, HETOXOL CS-15, HETOXOL CS-20, HETOXOL CS-25, HETOXOL CS-30, PLURAFAC A38 and PLURAFAC LF700 (from BASF); ST-8303 (from Cognis); AROSURF 66 E10 and AROSURF 66 E20 (from Witco/Crompton); ethoxylated (9.4 EO) tallow, propoxylated (4.4 EO) tallow and alkoxylated (5-16 EO and 2-5 PO) tallow (from Witco/Crompton). Also preferred are; SURFONIC NP95 of Huntsman (a polyoxyethylene (9.5) nonylphenol); TERGITOL series from Dow and commercially available from Sigma-Aldrich Co. (Saint Louis, Mo.), including TERGITOL-15-S-5, TERGITOL-15-S-9, TERGITOL-15-S-12 and TERGITOL-15-S-15 (made from secondary, linear $C_{11}$ to $C_{15}$ alcohols with an average of 5 moles, 9 moles, 12.3 moles and 15.5 moles of ethoxylation, respectively); the SURFONIC LF-X series from Huntsman Chemical Co. (Salt Lake City, Utah), including L12-7 and L12-8 (made from linear $C_{10}$ to $C_{12}$ alcohols with an average of 7 moles and 8 moles, respectively, of ethoxylation), L24-7, L24-9 and L24-12 (made from linear $C_{12}$ to $C_{14}$ alcohols with an average of 7 moles, 9 moles and 12 moles of ethoxylation, respectively), L68-20 (made from primary, linear $C_{16-18}$ alcohols with an average of 20 moles of ethoxylation) and L26-6.5 (made from linear $C_{12}$ to $C_{16}$ alcohols with an average of 6.5 moles of ethoxylation); and Ethylan 68-30 ($C_{16-18}$ with an average of 20 moles of ethoxylation) available from Akzo Nobel.

Amidoalkylamine surfactants for use in the herbicidal compositions of the present invention have the general structure (13):

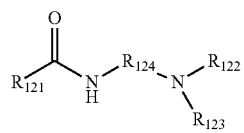

(13)

wherein $R_{121}$ is a hydrocarbyl or substituted hydrocarbyl having from 1 to about 22 carbon atoms, $R_{122}$ and $R_{123}$ are each independently hydrocarbyl or substituted hydrocarbyl having from 1 to about 6 carbon atoms and $R_{124}$ is hydrocarbylene or substituted hydrocarbylene having from 1 to about 6 carbon atoms.

$R_{121}$ is preferably an alkyl or substituted alkyl having an average value of carbon atoms between about 4 to about carbon atoms, preferably an average value between about 4 and about 18 carbon atoms, more preferably an average value from about 4 to about 12 carbon atoms, more preferably an average value from about 5 to about 12 carbon atoms, even more preferably an average value from about 6 to about 12 carbon atoms, and still more preferably an average value from about 6 to about 10 carbon atoms. The $R_{121}$ alkyl group may be derived from a variety of sources that provide alkyl groups having from about 4 to about 18 carbon atoms, for example, the source may be butyric acid, valeric acid, caprylic acid, capric acid, coco (comprising mainly lauric acid), myristic acid (from, e.g., palm oil), soy (comprising mainly linoleic acid, oleic acid, and palmitic acid), or tallow (comprising mainly palmitic acid, oleic acid, and stearic acid). In some embodiments, the amidoalkylamine surfactant component may comprise a blend of amidoalkylamines having alkyl chains of various lengths from about 5 carbon atoms to about 12 carbon atoms. For example, depending upon the source of the $R_{121}$ alkyl group, an amidoalkylamine surfactant component may comprise a blend of surfactants having $R_{121}$ groups that are 5 carbon atoms in length, 6 carbon atoms in length, 7 carbon atoms in length, 8 carbon atoms in length, 9 carbon atoms in length, 10 carbon atoms in length, 11 carbon atoms in length, and 12 carbon atoms in length, longer carbon chains, and combinations thereof. In other embodiments, the amidoalkylamine surfactant component may comprise a blend of surfactants having $R_{121}$ groups that are 5 carbon atoms in length, 6 carbon atoms in length, 7 carbon atoms in length, and 8 carbon atoms in length. In some alternative embodiments, the amidoalkylamine surfactant component may comprise a blend of surfactants having $R_1$ groups that are 6 carbon atoms in length, 7 carbon atoms in length, 8 carbon atoms in length, 9 carbon atoms in length, and 10 carbon atoms in length. In other embodiments, the amidoalkylamine surfactant component may comprise a blend of surfactants having $R_{121}$ groups that are 8 carbon atoms in length, 9 carbon atoms in length, 10 carbon atoms in length, 11 carbon atoms in length, and 12 carbon atoms in length.

$R_{122}$ and $R_{123}$ are independently preferably an alkyl or substituted alkyl having from 1 to about 4 carbon atoms. $R_{122}$ and $R_{123}$ are most preferably independently an alkyl having from 1 to about 4 carbon atoms, and most preferably methyl. $R_{124}$ is preferably an alkylene or substituted alkylene having from 1 to about 4 carbon atoms. $R_{124}$ is most preferably an alkylene having from 1 to about 4 carbon atoms, and most preferably n-propylene. When $R_{124}$ is n-propylene, the amidoalkylamine surfactants are termed amidopropylamine (APA) surfactants.

In one preferred amidoalkylamine surfactant, $R_{121}$ is $C_{6-10}$, i.e., an alkyl group having 6 carbon atoms, 7 carbon atoms, 8 carbon atoms, 9 carbon atoms, 10 carbon atoms, or a blend of any of these, i.e., from about 6 carbon atoms to about 10 carbon atoms; $R_{122}$ and $R_{123}$ are each methyl; and $R_{124}$ is n-propylene (i.e., $C_{6-10}$ amidopropyl dimethylamine).

Examples of APA surfactants include Armeen APA 2 (where $R_{121}$ is $C_2$ and $R_{122}$ and $R_{123}$ are each hydrogen), Armeen APA 6 (where $R_{121}$ is $C_6$ and $R_{122}$ and $R_{123}$ are each methyl), Armeen APA 8, (where $R_{121}$ is $C_{8-10}$ and $R_{122}$ and $R_{123}$ are each methyl), Armeen APA 12 (where $R_{121}$ is $C_{12}$ and $R_{122}$ and $R_{123}$ are each methyl), ACAR 7051 (where $R_{121}$ is $C_{5-9}$ and $R_{122}$ and $R_{123}$ are each methyl), ACAR 7059 (where $R_{121}$ is 2-ethyl hexyl and $R_{122}$ and $R_{123}$ are each methyl) and Adsee C80W (where $R_{121}$ is Coco and $R_{122}$ and $R_{123}$ are each methyl).

The herbicidal compositions may further comprise other conventional adjuvants such as solvents, emulsifiers, chelating agents, emollients, permeation enhancers, antioxidants, lubricants, pH adjusters, adjuvants, dyes, conventional drift control agents, safeners, thickeners, flow enhancers, antifoaming agents, freeze protectants and/or UV protectants.

Suitable drift control agents are known to those skilled in the art and include the commercial products GARDIAN, GARDIAN PLUS, DRI-GARD, PRO-ONE XL, ARRAY, COMPADRE, IN-PLACE, BRONC Max EDT, EDT CONCENTRATE, COVERAGE and BRONC PLUS DRY EDT. Safeners are likewise known to those skilled in the art and include isoxadifen, benoxacor and dichlormid known to those skilled in the art. These other additives or ingredients may be introduced into the compositions of the present invention to provide or improve certain desired properties or characteristics of the formulated product.

Generally, the aqueous gel compositions of the instant invention are formed by mechanically admixing a solution comprising one or more herbicides or mixture of herbicides and a soluble gel forming agent or gel forming agent solution. As described, above the total herbicide concentration is from about 1 to about 50 g a.e./L (0.1 to 5 wt %) and the gel forming agent concentration is likewise from about 0.1 to about 5 wt %. Accordingly, the weight ratio range of total herbicide concentration to gel forming agent is from about 50:1 to about 1:50, for example 1:1, 1:2, 1:5, 1:10, 1:25, 1:50, 50:1, 25:1, 10:1, 5:1, 2:1 and ranges thereof.

The pseudoplastic characteristics of the gel compositions provide for advantages in processing. The herbicides and gel forming agents can be combined with agitation, having sufficient shear to cause a composition viscosity decrease. The resulting thin composition increases mixing efficiency minimizes power consumption and heat generation and thus maximizes processing efficiency.

In some embodiments of the present invention, polyacrylic acid or a CARBOPOL-derived gel forming agents or other pH-responsive gel forming agents are advantageously used because at an acidic pH (about 5 or below) these gel forming agents do not appreciably thicken the solution. Therefore, herbicides such as glyphosate mono salts, having a pH of less than about 5, can be easily admixed with the gel forming agent. In some other embodiments of the present invention, a gellan gum gel forming agent is used as the gel forming agent because it does not appreciably thicken in solution at a pH of about 3.5 or below. Thereafter a gel can be formed by pH adjustment above about 5 (or above about 3.5 for gellan gum). Alternatively, a solution of basic herbicide can be adjusted to a pH of less than about 5 (or less than about 3.5 for gellan gum) followed by admixing with the polyacrylic acid or CARBOPOL gel forming agent (or gellan gum). The pH of the mixture can then be adjusted above 5 (or 3.5) to form the gel.

Suitable bases for neutralizing polyacrylic acid polymers and other pH-responsive gel forming agents include, for example and without limitation, sodium hydroxide, potassium hydroxide, ammonia, and amines such as monoethanolamine, diethanolamine and triethanolamine.

The present invention is further directed to methods of confined application of agrochemical gels to unwanted plants such as weeds and/or certain crop plants such as volunteer crops that germinate and grow from a seed remaining after the harvest of a prior crop plant. As explained above, in some embodiments, the gel compositions of the present invention can be directly applied to the foliage or exposed areas of individual plants such as by spraying from hand-held sprayers (e.g. a spray bottle), canisters or tanks, or by applicators such as brushes, rollers or sponges. In other embodiments, the gels can broadcast applied to larger areas containing unwanted plant growth my methods known in the art such as by applying to a foliage canopy by spraying. The shear generated during pumping, brushing, shaking, stirring or transfer through a spray nozzle reduces gel viscosity to allow the composition to flow and thereby facilitate the efficient application or dispersal of the gel composition.

In more detail, in accordance with the present invention, the aqueous gel compositions may be directly applied to plant foliage by any of various means known in the art including, but not limited to, (i) application to a foliage canopy using aerial spraying systems, farm-scale ground based spraying application such as from a truck or trailer mounted system, or hand-held spraying methods such as from a canister or tank or (ii) targeted application to plant foliage of individual plants by using hand-held sprayers, brushes, rollers, sponges, wick applicators. The gel compositions can be optionally applied to non-foliar plant tissue by methods including (i) cut stump application wherein the plant is cut off completely at its base leaving a stump and root system, and the gel composition is applied onto the cut surface of the stump, (ii) cut and swab application wherein plants such as vines or multi-stemmed shrubs are cut completely through and the gel composition is applied to the cut surface emerging from the ground, (iii) stem scraping wherein a thin layer of bark is scraped or otherwise removed from a section of a stem and the gel composition is applied to the exposed plant tissue or (iv) hack and squirt application wherein a ring of bark is removed from the trunk of the plant, typically using downward cuts, leaving a reservoir or "cup" to hold applied agrochemicals into which the gel composition is then applied and thereby exposed plant tissue in the cut area.

After the gel composition is applied to the plant (such as onto foliage), where low or zero shear conditions are present, the viscosity increases to about the viscosity observed under static conditions. The retention time on the plant is significantly enhanced due to the rheological properties of the gel as previously described. For example, as compared to broadcast applied herbicide or tank mixed herbicides known in the art, the substantially greater stationary viscosity and elastic nature of the gels of the present invention improves adhesion and retention time on the plant. In addition, the applied gel compositions of the present invention resist drying and have an ability to retain moisture content for significantly longer durations in comparison to broadcast applied herbicide or tank mixed herbicides of the prior art.

Unwanted plants within the scope of the present inventions include, without limitation, weeds and/or volunteer crop plants. Volunteer crop plants of the present invention include hybrids, inbreds, and transgenic or genetically modified plants such as, vegetable crops, grain crops, flowers, root crops and sod. Examples of volunteer crop plants include corn, cotton and soybeans. Weeds include velvetleaf (*Abutilon theophrasti*), pigweed (*Amaranthus* spp.), buttonweed (*Borreria* spp.), indian mustard (*Brassica* spp.), commelina (*Commelina* spp.), filaree (*Erodium* spp.), sunflower (*Helianthus* spp.), morningglory (*Ipomoea* spp.), kochia (*Kochia scoparia*), mallow (*Malva* spp.), wild buckwheat, smartweed (*Polygonum* spp.), purslane (*Portulaca* spp.), russian thistle (*Salsola* spp.), sida (*Sida* spp.), wild mustard (*Sinapis arvensis*), cocklebur (*Xanthium* spp.), wild oat (*Avena fatua*), carpetgrass (*Axonopus* spp.), downy brome (*Bromus tectorum*), crabgrass (*Digitaria* spp.), barnyardgrass (*Echinochloa crus-galli*), goosegrass (*Eleusine indica*), annual ryegrass (*Lolium multiflorum*), ottochloa (*Ottochloa nodosa*), bahiagrass (*Paspalum notatum*), canarygrass (*Phalaris* spp.), foxtail (*Setaria* spp.), mugwort (*Artemisia* spp.), milkweed (*Asclepias* spp.), canada thistle (*Cirsium arvense*), field bindweed (*Convolvulus arvensis*), kudzu (*Pueraria* spp.), brachiaria (*Brachiaria* spp.), bermudagrass (*Cynodon dactylon*), yellow nutsedge (*Cyperus esculentus*), purple nutsedge (*C. rotundus*), quackgrass (*Elymus repens*), lalang (*Imperata cylindrica*), perennial ryegrass (*Lolium perenne*), guineagrass (*Panicum maximum*), dallisgrass (*Paspalum dilatatum*), reed (*Phragmites* spp.), johnsongrass (*Sorghum halepense*), cattail (*Typha* spp.), horsetail (*Equisetum* spp.), bracken (*Pteridium aquilinum*), blackberry (*Rubus* spp.), and gorse (*Ulex europaeus*).

In some embodiments of the present invention, the target weeds, volunteer crop plants and/or desirable crop plants can have one or more herbicide tolerant traits. For example, the plants may have tolerance to glyphosate, auxins (e.g., 2,4-D, dicamba, etc.), glufosinate, acetolactate synthase inhibitor herbicides or acetyl CoA carboxylase inhibitors (e.g., sethoxydim), etc.). In other embodiments, the crop plants comprise stacked traits such as auxin and glyphosate tolerance. In other embodiments, the plants can additionally include other herbicide, insect and disease tolerance traits, as well as combinations of those traits.

In some methods, glyphosate gel compositions of the present invention are applied to the foliage canopy of weeds and/or volunteer crop plants (collectively termed hereafter "unwanted plants") wherein the unwanted plants are growing in and/or adjacent to a field of desirable crop plants having a glyphosate-tolerant trait.

In some other methods, the water-soluble herbicide component of the gel compositions comprises glyphosate and glufosinate or glufosinate-P and the desirable crop plants have glyphosate-tolerant and glufosinate-tolerant traits. Such methods are useful for controlling unwanted plants having glyphosate or glufosinate tolerance.

In some other methods, the water-soluble herbicide component of the gel compositions comprises glyphosate and at least one auxin herbicide, and the desirable crop plants have glyphosate-tolerant and auxin-tolerant traits. Such methods are useful for controlling unwanted plants having glyphosate or auxin tolerance.

In some other methods, the water-soluble herbicide component of the gel compositions comprises glyphosate and at least one ALS inhibitor herbicide (or racemic mixtures or resolved isomers thereof, and/or salts or esters thereof), and the desirable crop plants have glyphosate-tolerant and ALS inhibitor-tolerant traits. Such methods are useful for controlling unwanted plants having glyphosate or ALS inhibitor tolerance.

In some other methods, the water-soluble herbicide component of the gel compositions comprises glyphosate, at least one auxin herbicide, and glufosinate or glufosinate-P (or salts or esters thereof), and the desirable crop plants have glyphosate, auxin and glufosinate-tolerant traits. Such methods are useful for controlling unwanted plants having glyphosate, glufosinate or auxin tolerance, or tolerance to herbicides from two of those classes, as well combinations of such unwanted plants species. For instance, the method would be useful for the control of a first unwanted plant species having glyphosate tolerance, and a second unwanted plant species having tolerance to auxins and glufosinate wherein both unwanted plant species are present in a field of the crop plants.

In some other methods, the water-soluble herbicide component of the gel compositions comprises glyphosate, at least one auxin herbicide and at least one ALS inhibitor herbicide (or racemic mixtures or resolved isomers thereof, and/or salts or esters thereof), and the desirable crop plants have glyphosate, auxin and ALS inhibitor-tolerant traits. Such methods are useful for controlling unwanted plants having glyphosate, auxin or ALS inhibitor-tolerance, or tolerance to herbicides from two of those classes, as well combinations of such unwanted plants species. For instance, the method would be useful for the control of a first unwanted plant species having glyphosate tolerance, and a second unwanted plant species having tolerance to auxins and ALS inhibitors wherein both unwanted plant species are present in a field of the crop plants.

In some other methods, the water-soluble herbicide component of the gel compositions comprises glyphosate, at least one ALS inhibitor herbicide and glufosinate or glufosinate-P (or racemic mixtures or resolved isomers thereof, and/or salts or esters thereof), and the desirable crop plants have glyphosate, ALS inhibitor and glufosinate-tolerant traits. Such methods are useful for controlling unwanted plants having glyphosate, ALS inhibitor or glufosinate-tolerance, or tolerance to two of those herbicides, as well combinations of such unwanted plants species. For instance, the method would be useful for the control of a first unwanted plant species having glyphosate tolerance, and a second unwanted plant species having tolerance to ALS inhibitors and glufosinate wherein both unwanted plant species are present in a field of the crop plants.

In yet some other methods, the water-soluble herbicide component of the gel compositions comprises glyphosate, at least one auxin herbicide, at least one ALS inhibitor herbicide and glufosinate or glufosinate-P (or racemic mixtures or resolved isomers thereof, and/or salts or esters thereof), and the desirable crop plants have glyphosate, auxin, ALS inhibitor and glufosinate-tolerant traits. Such methods are useful for controlling unwanted plants having glyphosate, auxin, ALS inhibitor or glufosinate-tolerance, or tolerance to up to three of those herbicides, as well combinations of such unwanted plants species. For instance, the method would be useful for the control of a first unwanted plant species having glyphosate tolerance, and a second unwanted plant species having tolerance to ALS inhibitors, glufosinate and auxins wherein both unwanted plant species are present in a field of the crop plants.

In embodiments of the present invention wherein the crop plant has an auxin-tolerant trait, when the auxin herbicide is 2,4-D, the crop plant is tolerant to 2,4-D; when the auxin herbicide is aminopyralid, the crop plant is tolerant to aminopyralid; when the auxin herbicide is clopyralid, the crop plant is tolerant to clopyralid; when the auxin herbicide is dicamba, the crop plant is tolerant to dicamba; when the auxin herbicide is fluoroxypyr, the crop plant is tolerant to fluoroxypyr; when the auxin herbicide is mecoprop or mecoprop-P, the crop plant is tolerant to mecoprop; when the auxin herbicide is picloram, the crop plant is tolerant to picloram; and/or when the auxin herbicide is triclopyr, the crop plant is tolerant to triclopyr. In some embodiments the auxin herbicide is 2,4-D or dicamba.

In embodiments of the present invention wherein the crop plant has an ALS or AHAS tolerant trait, when the ALS or AHAS inhibitor herbicide is imazamethabenz-m, the crop plant is tolerant to imazamethabenz-m; when the ALS or AHAS inhibitor herbicide is imazamox, the crop plant is tolerant to imazamox; when the ALS or AHAS inhibitor herbicide is imazapic, the crop plant is tolerant to imazapic; when the ALS or AHAS inhibitor herbicide is imazapyr, the crop plant is tolerant to imazapyr; when the ALS or AHAS inhibitor herbicide is imazaquin, the crop plant is tolerant to imazaquin; and/or when the ALS or AHAS inhibitor herbicide is imazethapyr, the crop plant is tolerant to imazethapyr.

The methods of the present invention enable from about 10 to about 20, from about 10 to about 30, from about 10 to about 40 or from about 10 to about 50 percent by weight of the amount of agrochemical applied to the plant foliage to be transferred into the plant. This represents a significant advance over the prior art where typically only about 10 percent of an applied agrochemical is transferred into the target plant.

In some of the inventive methods, at least 60%, 65%, 70%, 75%, 80%, or even at least 85%, or even at least 90% control of the unwanted plants is achieved. Although it is generally preferable from a commercial viewpoint that 80-85% or more of the plants be destroyed, commercially significant plant control can occur at much lower levels, particularly with some very noxious, herbicide-resistant plants. "Plant control," as used herein, refers to any observable measure of control of plant growth, which can include one or more of the actions of (1) killing, (2) inhibiting growth, reproduction or proliferation, and (3) removing, destroying, or otherwise diminishing the occurrence and activity of plants. Plant control can be measured by any of the various methods known in the art. For example, plant control can be determined as a percentage as compared to untreated plants following a standard procedure wherein a visual assessment of plant mortality and growth reduction is made by one skilled in the art specially trained to make such assessments. In another control measurement method, control is defined as a mean plant weight reduction percentage between treated and untreated plants.

In some of the inventive methods, injury to desirable crop plants is less than 20%, 15%, 10% or even less than about 5%. Damage to desirable crops can be measured by any means known in the art, such as those describe above for plant control determination.

In some embodiments of the present invention, at least 80% control of the unwanted plants is achieved no greater than 5, 10, 15, 20, 25 or 30 days after application of the compositions to the unwanted plants. In some embodiments, visual indications of plant injury are observable within one day of treatment. In some other embodiments, desirable crop plant injury is less than 20% no greater than 1, 5, 10, 15, 20, 25 or even 30 days after application of the compositions to the unwanted plants. In yet some other embodiments, at least 80% control of the unwanted plants is achieved and desirable crop plant injury is less than 20%, preferably not greater than 30 days after application of the compositions.

Having described the invention in detail, it will be apparent that modifications and variations are possible without departing from the scope of the invention defined in the appended claims.

EXAMPLES

The following non-limiting examples are provided to further illustrate the present invention.

The components in Table I below are used in the Examples.

TABLE I

| Component | Description |
|---|---|
| Gel1 | Carbopol Aqua 30, 30% polymer |
| Gel2 | Carbopol 1342 |
| Gel3 | Carbopol Ultrez 20 |
| Gel4 | Carbopol EZ3 |
| Gel5 | 2% CMC-9000 |
| Gel6 | Kelzan ASX |
| Gel7 | Kelzan ASX T |
| Surf1 | 70% tallowamine 15 EO surfactant: PEG: ethylene glycol |
| Surf2 | Tomadol 1-7 |
| Surf3 | Witco C-6150 ether amine ethoxylate |
| Surf4 | Surfonic AGM 550 surfactant |
| Surf5 | 55% tallowamine 10EO (Witcamine TAM-105): 45% cocoamine 2EO (Witcamine 302) |
| Dfm1 | SAG 1671 silicone antifoam emulsion |
| Dfm2 | SAG 10 silicone antifoam emulsion |
| Dfm3 | SAG 1572 silicone antifoam emulsion |

The composition of the experimental glyphosate aqueous gel formulations is indicated in Table II, III, and IV below where the concentrations are reported on a weight percent acid equivalent basis unless indicated otherwise. In Table III, "RU SC" refers to ROUNDUP SUPER CONCENTRATE ("RU SC") available from Monsanto company and that contains 445 grams a.e. per liter of the isopropylamine salt of glyphosate and surfactant. The formulations were typically prepared by first making an aqueous solution of the glyphosate salt followed by addition of the antifoam agent (if present), the surfactant (if present), the gelling or thickening agent and finally the base.

Alternatively, the order of addition could be as follows, dilution of the glyphosate salt into water, addition of the base followed by addition of the gel premix with adjustment of pH to near neutral if needed by further addition of base. In Tables II-IV, "IPA-gly" refers to isopropylamine glyphosate, "surf." Refers to surfactant, "gly salt" refers to glyphosate salt, and wt % gel refers to weight percent gel on an active basis.

TABLE II

| Formulation | M257 | M258 | M261 | M262 | 817-3 |
|---|---|---|---|---|---|
| IPA-gly (wt % a.e.) | 0.74 | 0.74 | 0.74 | 0.74 | 0.74 |
| Gel | Gel1 | Gel1 | Gel1 | Gel1 | Gel2 |
| wt % gel | 3.0 | 3.0 | 3.0 | 3.0 | 0.75 |
| surf. | Surf1 | none | none | Surf1 | none |
| wt % surf. | 0.25 | 0 | 0 | 0.25 | 0 |
| Pelargonic acid wt % | 0 | 0 | 2.00 | 2.00 | 0 |
| Base | KOH | KOH | KOH | KOH | KOH |
| pH | 7 | 7 | 7.5 | 7.5 | 7 |

| Formulation | 821-4 | 822-5 | 827-2 | 469 |
|---|---|---|---|---|
| IPA-gly (wt % a.e.) | 0.74 | 0.74 | 0.74 | 0.74 |
| Gel | Gel2 | Gel5 | Gel5 | Gel1 |
| wt % gel | 0.75 | 1.3 | 1.3 | 3.0 |
| surf. | Surf1 | none | Surf1 | none |
| wt % surf. | 0.25 | 0 | 0.25 | 0 |
| Pelargonic acid wt % | 0 | 0 | 0 | 0 |
| Base | KOH | KOH | KOH | KOH |
| pH | 7 | nd | Nd | 6-6.5 | nd refers to "not determined"

TABLE III

| Formulation | N893B | N893C | N894A | N894B | RU SC |
|---|---|---|---|---|---|
| IPA-gly wt % a.e. | 0.07 | 0.19 | 0.37 | 0.56 | 50.3 |
| Gel | Gel1 | Gel1 | Gel1 | Gel1 | none |
| wt % gel | 3.0 | 3.0 | 3.0 | 3.0 | 0 |
| Base | KOH | KOH | KOH | KOH | none |
| pH | 7 | 7 | 7 | 7 | |

Except for M737 all formulations in Table IV below also contain 0.1 g Proxel GXL and 0.1 g antifoam agent Sag 1572 per 100 g solution. Additionally, formulations N485-6, N485-7, N485-8 and M737 contain 1% pelargonic acid.

TABLE IV

| Form. | Gly Salt | wt % a.e. | Gel1 | Base | Comp2 | Comp2 amt (g) | pH |
|---|---|---|---|---|---|---|---|
| N482-5 | IPA | 0.51 | 3.0 | KOH | None | 0 | 7.0 |
| N482-4 | IPA | 0.74 | 3.0 | KOH | None | 0 | 7.2 |
| N482-1 | IPA | 1.00 | 3.0 | KOH | None | 0 | 6.9 |
| N485-1 | K | 0.51 | 3.0 | KOH | none | 0 | 7.1 |
| N479-2 | K | 0.75 | 3.0 | KOH | none | 0 | 6.9 |
| N479-3 | K | 1.00 | 3.0 | KOH | none | 0 | 6.9 |
| N485-4 | K | 0.51 | 3.0 | KOH | SURF1 | 0.2 | 7.0 |
| N485-3 | K | 0.75 | 3.0 | KOH | SURF1 | 0.2 | 7.4 |
| N485-2 | K | 1.0 | 3.0 | KOH | SURF1 | 0.2 | 7.2 |
| N485-5 | K | 0175 | 3.0 | KOH | SURF1 | 0.4 | 7.3 |
| N485-6 | K | 0.75 | 3.0 | KOH | None | 0 | 7.5 |
| N485-7 | K | 0.75 | 3.0 | KOH | SURF1 | 0.2 | 6.9 |
| N485-8 | K | 0.75 | 3.0 | KOH | AMS | 1.0 | 6.8 |
| N482-2 | IPA | 1.0 | 3.0 | TEA | none | 0 | 6.9 |
| N482-3 | IPA | 1.0 | 3.0 | NaOH | None | 0 | 7.4 |
| M737 | IPA | 0.72 | 0 | none | SURF1 | 0.15 | nd |

Example 1

Rheology Experiments

The rheology properties for formulation M258 from Table II, additionally containing 0.01% antifoam agent Dfm3 and 0.1% Proxel GXL biocide, were measured. Viscosity as a function of shear rate was measured using a TA rheometer with a 60 mm 2° acrylic cone and plate at 20° C. with an oscillating frequency of 100 rad/s. The results are reported in Table 1a and are depicted in FIG. 1.

TABLE 1a

| shear rate (s−1) | Viscosity (Pa · s) | Shear (RPM) | Viscosity (cps) |
|---|---|---|---|
| 1 | 19.47 | 0.02 | 19470 |
| 11 | 2.77 | 0.18 | 2769 |
| 21 | 1.67 | 0.35 | 1668 |
| 31 | 1.25 | 0.52 | 1245 |
| 42 | 1.02 | 0.70 | 1016 |
| 52 | 0.87 | 0.87 | 869 |
| 62 | 0.77 | 1.03 | 768 |
| 72 | 0.69 | 1.20 | 693 |
| 82 | 0.64 | 1.37 | 635 |
| 92 | 0.59 | 1.53 | 589 |
| 103 | 0.55 | 1.72 | 550 |
| 113 | 0.52 | 1.88 | 518 |
| 123 | 0.49 | 2.05 | 491 |
| 133 | 0.47 | 2.22 | 468 |
| 143 | 0.45 | 2.38 | 448 |
| 153 | 0.43 | 2.55 | 430 |
| 163 | 0.41 | 2.72 | 414 |
| 174 | 0.40 | 2.90 | 400 |
| 184 | 0.39 | 3.07 | 387 |
| 194 | 0.38 | 3.23 | 376 |
| 204 | 0.37 | 3.40 | 365 |
| 214 | 0.36 | 3.57 | 356 |
| 224 | 0.35 | 3.73 | 347 |
| 235 | 0.34 | 3.92 | 340 |
| 245 | 0.33 | 4.08 | 331 |
| 255 | 0.32 | 4.25 | 324 |
| 265 | 0.32 | 4.42 | 318 |
| 275 | 0.31 | 4.58 | 312 |
| 285 | 0.31 | 4.75 | 306 |
| 295 | 0.30 | 4.92 | 301 |
| 306 | 0.30 | 5.10 | 296 |
| 316 | 0.29 | 5.27 | 291 |
| 326 | 0.29 | 5.43 | 286 |
| 336 | 0.28 | 5.60 | 282 |
| 346 | 0.28 | 5.77 | 278 |
| 356 | 0.27 | 5.93 | 274 |
| 367 | 0.27 | 6.12 | 271 |
| 377 | 0.27 | 6.28 | 268 |
| 387 | 0.26 | 6.45 | 264 |
| 397 | 0.26 | 6.62 | 261 |
| 407 | 0.26 | 6.78 | 258 |
| 417 | 0.26 | 6.95 | 255 |
| 427 | 0.25 | 7.12 | 253 |
| 438 | 0.25 | 7.30 | 250 |
| 448 | 0.25 | 7.47 | 248 |
| 458 | 0.25 | 7.63 | 245 |
| 468 | 0.24 | 7.80 | 243 |
| 478 | 0.24 | 7.97 | 241 |
| 488 | 0.24 | 8.13 | 239 |
| 499 | 0.24 | 8.32 | 237 |

TABLE 1a-continued

| shear rate (s−1) | Viscosity (Pa · s) | Shear (RPM) | Viscosity (cps) |
|---|---|---|---|
| 509 | 0.24 | 8.48 | 235 |
| 519 | 0.23 | 8.65 | 233 |
| 529 | 0.23 | 8.82 | 232 |
| 539 | 0.23 | 8.98 | 230 |
| 549 | 0.23 | 9.15 | 229 |
| 559 | 0.23 | 9.32 | 228 |
| 570 | 0.23 | 9.50 | 226 |
| 580 | 0.22 | 9.67 | 225 |
| 590 | 0.22 | 9.83 | 224 |
| 600 | 0.22 | 10.00 | 222 |

Figure 2:
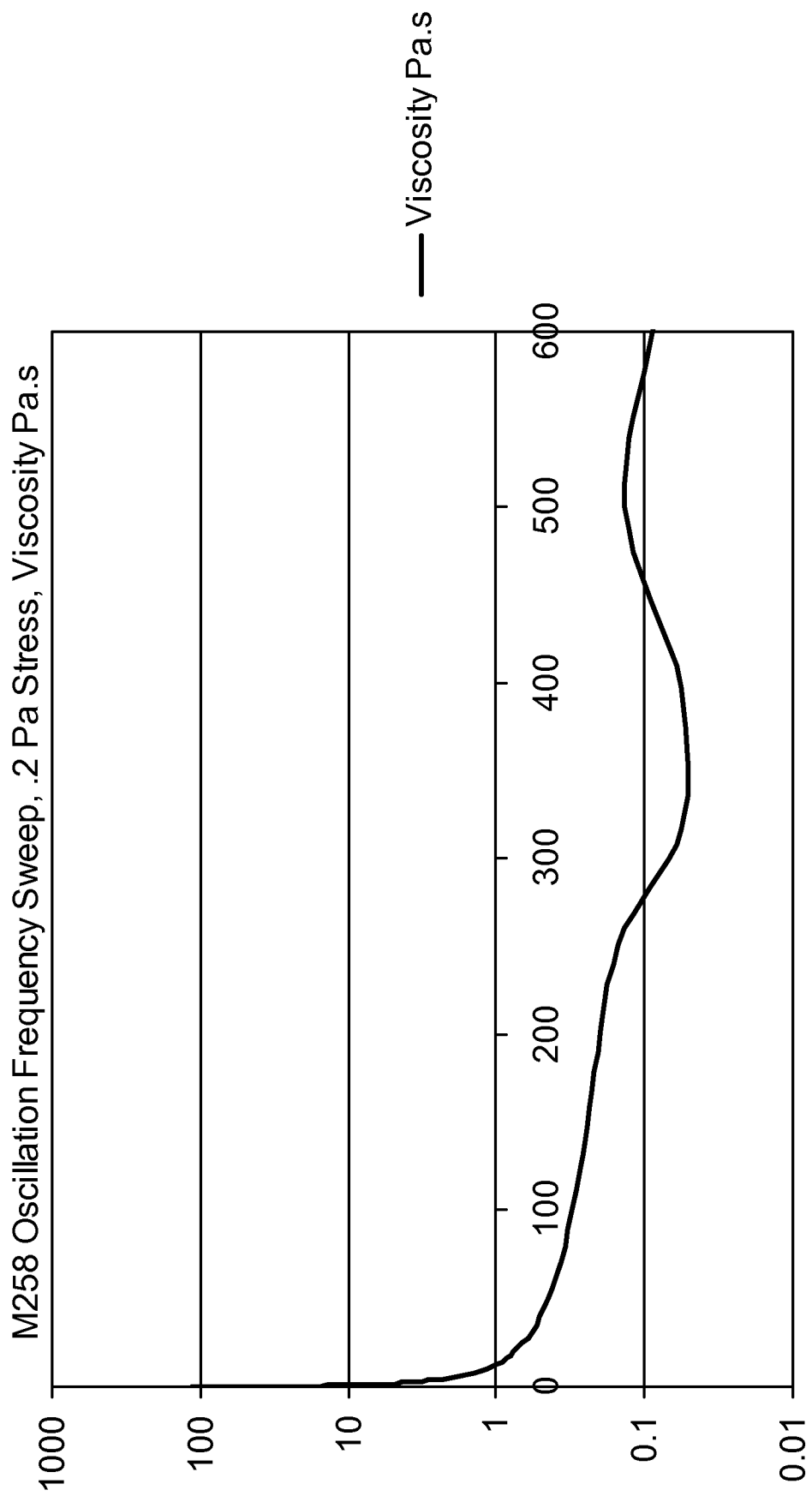
FIG. 2 is a graph depicting the viscosity of a glyphosate gel composition of the present invention as a function of oscillation frequency sweep at 0.2 Pa stress. The data were obtained according to the method described in Example 1.
Figure 3:
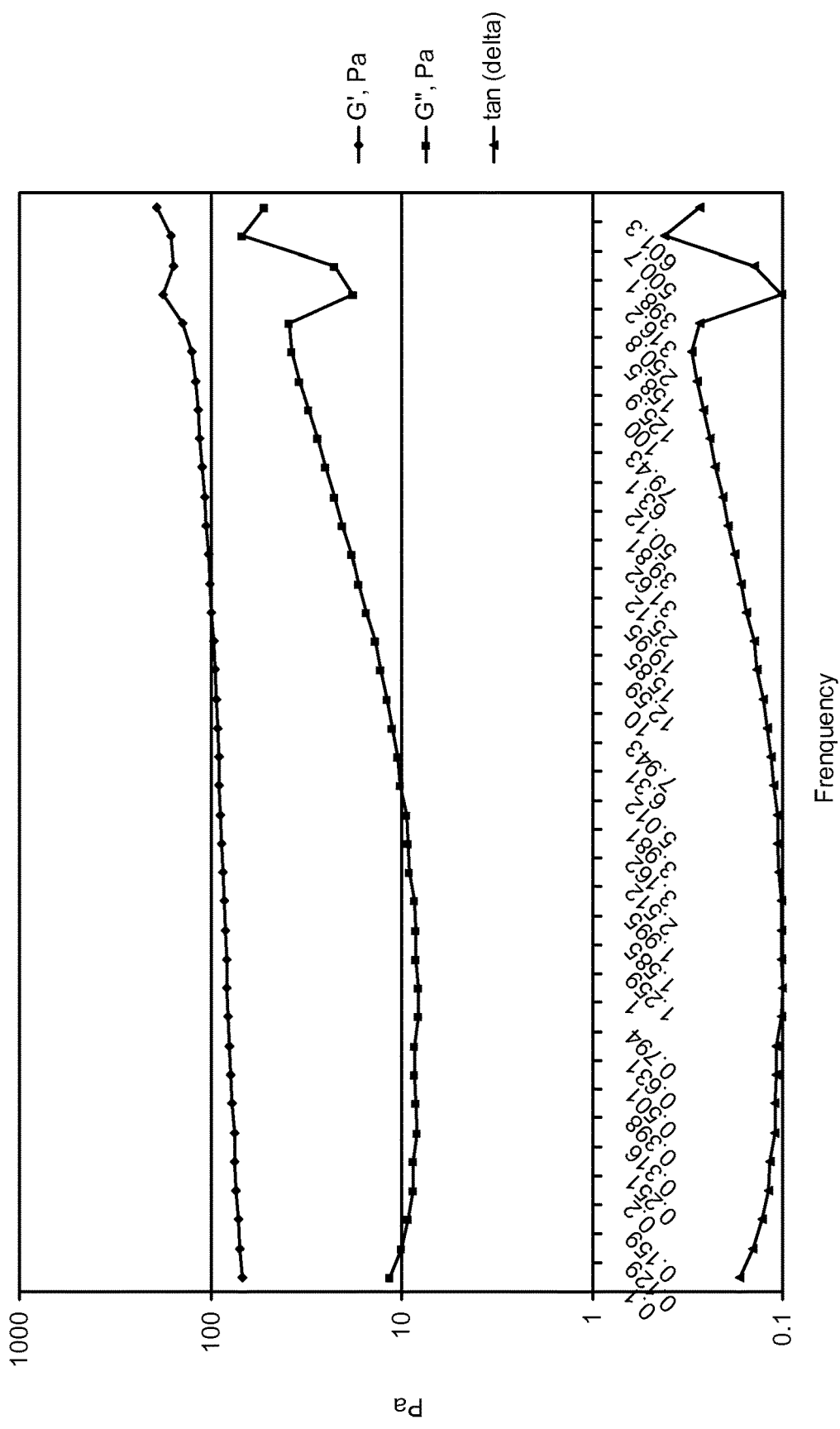
FIG. 3 is a graph depicting G', G" and tan(delta) for a glyphosate gel composition of the present invention as a function of oscillation frequency sweep at 0.2 Pa stress. The data were obtained according to the method described in Example 1.
Figure 4:
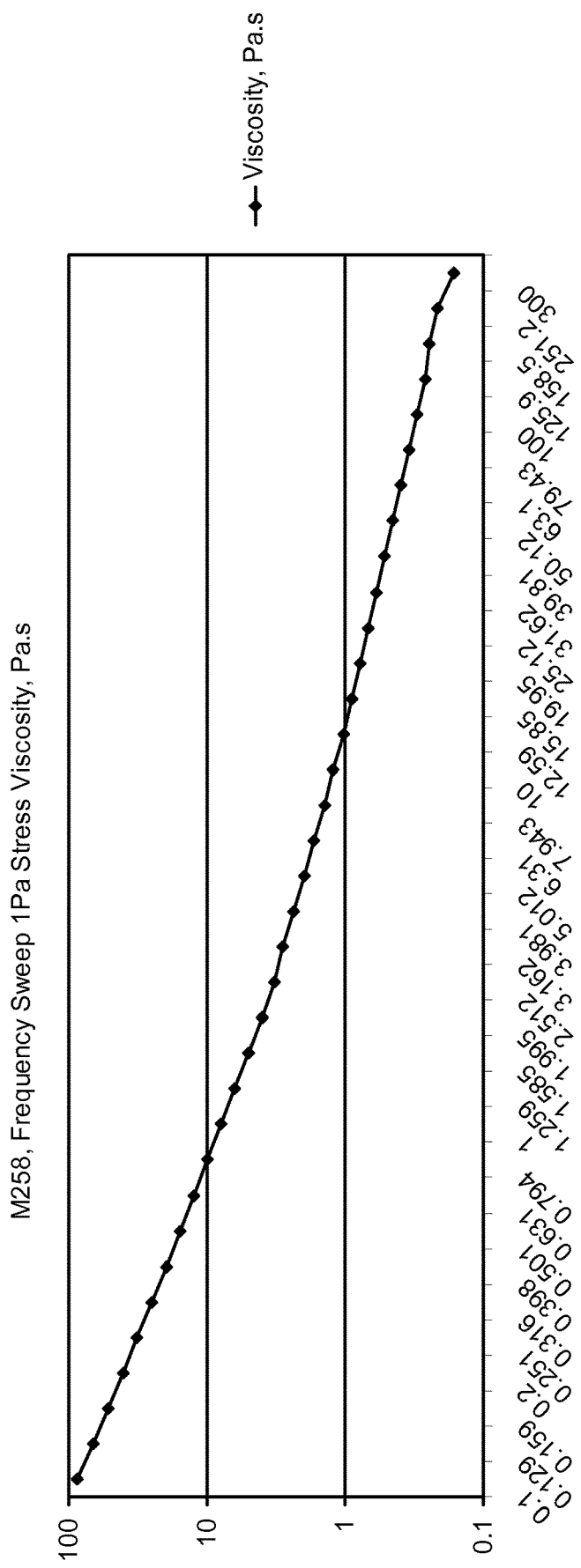
FIG. 4 is a graph depicting the viscosity of a glyphosate gel composition of the present invention as a function of oscillation frequency sweep at 1 Pa stress. The data were obtained according to the method described in Example 1.
Figure 5:
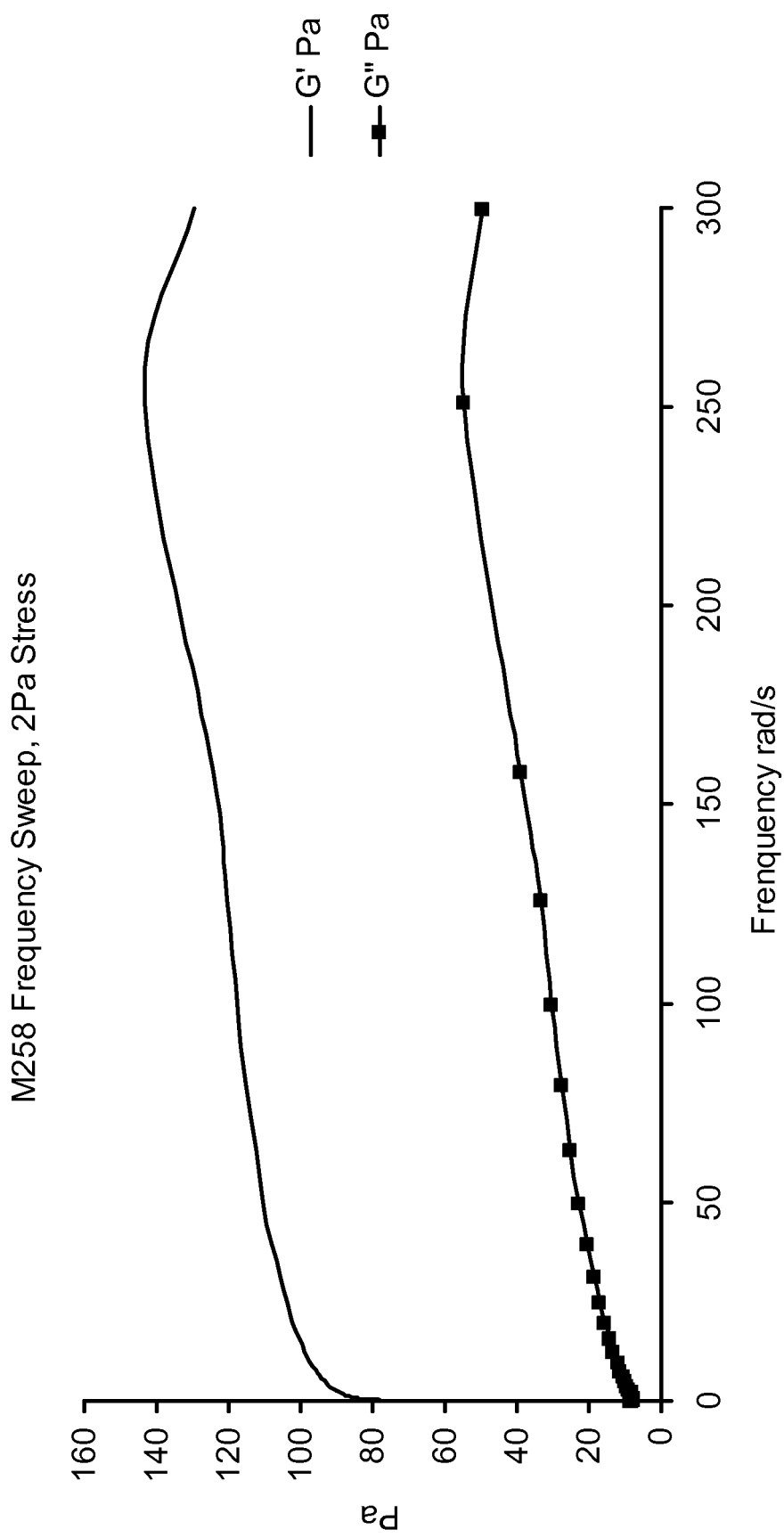
FIG. 5 is a graph depicting G' and G" for a glyphosate gel composition of the present invention as a function of oscillation frequency sweep at 2 Pa stress. The data were obtained according to the method described in Example 1.
Figure 6:
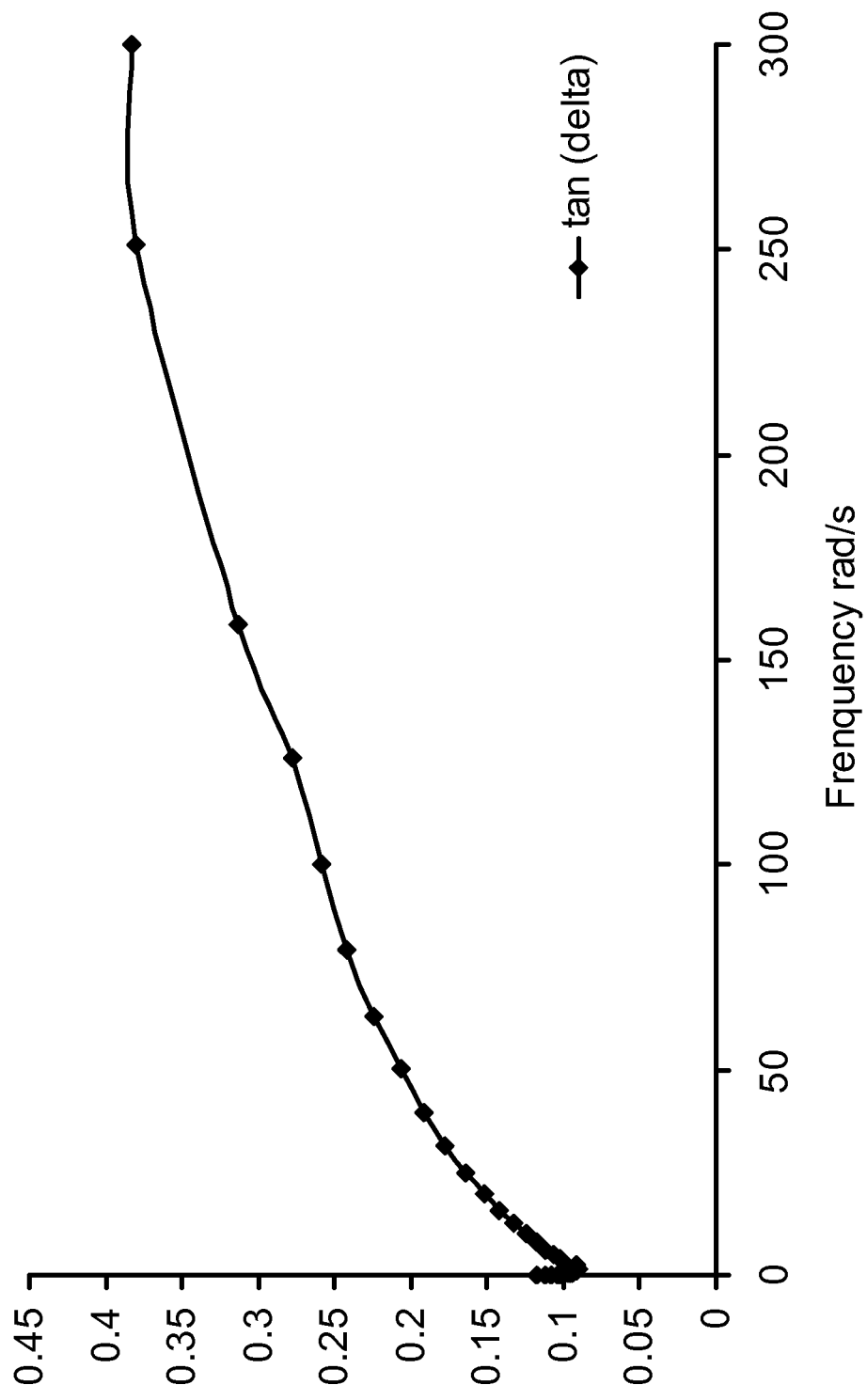
FIG. 6 is a graph depicting tan (delta) for a glyphosate gel composition of the present invention as a function of oscillation frequency sweep at 2 Pa stress. The data were obtained according to the method described in Example 1.

Oscillation frequency sweep rheometric measurements for M258 formulation at 0.2 Pa and 1 Pa were measured on a TA rheometer with a 60 mm 2° acrylic cone and plate at 20° C. The results 0.2 Pa results are shown in Table 1b and depicted in FIGS. 2 and 3. The 1 Pa results are shown in Table 1c and depicted in FIG. 4. In Tables 1b and 1c and FIGS. 3 and 5, G' is the elastic modulus, which is a measure of the ability of the gel to store energy and loosely corresponds to solid-like behavior, and G" is the viscous modulus, which is a measure of the tendency of the gel to dissipate energy that is transferred to the gel. This modulus is loosely correlated with liquid-like behavior. Tan (delta) is G"/G'.

TABLE 1b

Frequency Sweep at 0.2 Pa stress

| Frequency, rad/s | G' (Pa) | G" (Pa) | Viscosity Pa · s | tan (delta) |
|---|---|---|---|---|
| 0.1 | 68.4 | 11.51 | 115.1 | 0.168 |
| 0.129 | 70.4 | 10.04 | 79.79 | 0.143 |
| 0.159 | 71.8 | 9.26 | 58.4 | 0.129 |
| 0.2 | 73.1 | 8.73 | 43.77 | 0.119 |
| 0.251 | 74.3 | 8.68 | 34.56 | 0.117 |
| 0.316 | 75.4 | 8.32 | 26.32 | 0.110 |
| 0.398 | 76.9 | 8.4 | 21.1 | 0.109 |
| 0.501 | 78 | 8.48 | 16.93 | 0.109 |
| 0.631 | 79.2 | 8.58 | 13.6 | 0.108 |
| 0.794 | 80.6 | 8.18 | 10.3 | 0.102 |
| 1 | 81.6 | 8.2 | 8.2 | 0.100 |
| 1.259 | 82.6 | 8.43 | 6.7 | 0.102 |
| 1.585 | 84 | 8.47 | 5.34 | 0.101 |
| 1.995 | 85.2 | 8.61 | 4.31 | 0.101 |
| 2.512 | 86 | 9.05 | 3.61 | 0.105 |
| 3.162 | 87.1 | 9.31 | 2.94 | 0.107 |
| 3.981 | 88.3 | 9.42 | 2.37 | 0.107 |
| 5.012 | 89.8 | 10.08 | 2.01 | 0.112 |
| 6.31 | 90.9 | 10.53 | 1.67 | 0.116 |
| 7.943 | 92.3 | 11.23 | 1.41 | 0.122 |
| 10 | 93.5 | 11.8 | 1.18 | 0.126 |
| 12.59 | 95.1 | 12.94 | 1.03 | 0.136 |
| 15.85 | 96.6 | 13.71 | 0.86 | 0.142 |
| 19.95 | 98.5 | 15.33 | 0.77 | 0.156 |
| 25.12 | 100.4 | 16.73 | 0.67 | 0.167 |
| 31.62 | 102.2 | 18.27 | 0.58 | 0.179 |
| 39.81 | 104.9 | 20.44 | 0.51 | 0.195 |
| 50.12 | 107.3 | 22.18 | 0.44 | 0.207 |
| 63.1 | 110.1 | 24.94 | 0.4 | 0.227 |
| 79.43 | 113.4 | 27.54 | 0.35 | 0.243 |
| 100 | 116.8 | 30.55 | 0.31 | 0.262 |
| 125.9 | 120.5 | 33.95 | 0.27 | 0.282 |
| 158.5 | 124.9 | 37.68 | 0.24 | 0.302 |
| 250.8 | 140.4 | 38.43 | 0.15 | 0.274 |
| 316.2 | 176.9 | 17.99 | 0.06 | 0.102 |
| 398.1 | 155.7 | 22.14 | 0.06 | 0.142 |
| 500.7 | 160.7 | 67.55 | 0.13 | 0.420 |
| 601.3 | 192.5 | 52.42 | 0.09 | 0.272 |

TABLE 1c

Frequency Sweep at 1 Pa stress

| Frequency, rad/s | G' Pa | G" Pa | Viscosity, Pa · s | tan delta |
|---|---|---|---|---|
| 0.1 | 73.2 | 8.65 | 86.48 | 0.118 |
| 0.129 | 74.6 | 8.37 | 66.49 | 0.112 |
| 0.159 | 76 | 8.18 | 51.58 | 0.108 |
| 0.2 | 77.3 | 8.08 | 40.49 | 0.104 |
| 0.251 | 78.6 | 8.02 | 31.9 | 0.102 |
| 0.316 | 79.8 | 7.94 | 25.11 | 0.1 |
| 0.398 | 81 | 7.85 | 19.7 | 0.1 |
| 0.501 | 82.2 | 7.88 | 15.71 | 0.096 |
| 0.631 | 83.4 | 7.88 | 12.49 | 0.095 |
| 0.794 | 84.5 | 7.82 | 9.85 | 0.093 |
| 1 | 85.6 | 7.84 | 7.84 | 0.092 |
| 1.259 | 86.7 | 7.9 | 6.27 | 0.091 |
| 1.585 | 87.9 | 7.97 | 5.03 | 0.091 |
| 1.995 | 88.8 | 8.08 | 4.05 | 0.091 |
| 2.512 | 90.1 | 8.29 | 3.3 | 0.092 |
| 3.162 | 91.2 | 9.11 | 2.88 | 0.1 |
| 3.981 | 92.4 | 9.48 | 2.38 | 0.103 |
| 5.012 | 93.4 | 9.95 | 1.99 | 0.107 |
| 6.31 | 94.7 | 10.6 | 1.68 | 0.112 |
| 7.943 | 95.9 | 11.3 | 1.42 | 0.118 |
| 10 | 97.4 | 12.14 | 1.24 | 0.125 |
| 12.59 | 98.9 | 13.11 | 1.04 | 0.133 |
| 15.85 | 100.5 | 14.3 | 0.90 | 0.143 |
| 19.95 | 102.2 | 15.58 | 0.78 | 0.152 |
| 25.12 | 104 | 17.12 | 0.68 | 0.165 |
| 31.62 | 105.9 | 18.8 | 0.59 | 0.178 |
| 39.81 | 108.1 | 20.7 | 0.52 | 0.191 |
| 50.12 | 110.3 | 22.8 | 0.46 | 0.207 |
| 63.1 | 112.6 | 25.19 | 0.4 | 0.224 |
| 79.43 | 115.1 | 27.82 | 0.35 | 0.242 |
| 100 | 117.4 | 30.37 | 0.30 | 0.259 |
| 125.9 | 120.4 | 33.44 | 0.27 | 0.278 |
| 158.5 | 124.1 | 38.94 | 0.25 | 0.314 |
| 251.2 | 143.3 | 54.53 | 0.22 | 0.381 |
| 300 | 129.6 | 49.58 | 0.17 | 0.383 |

Figure 7:
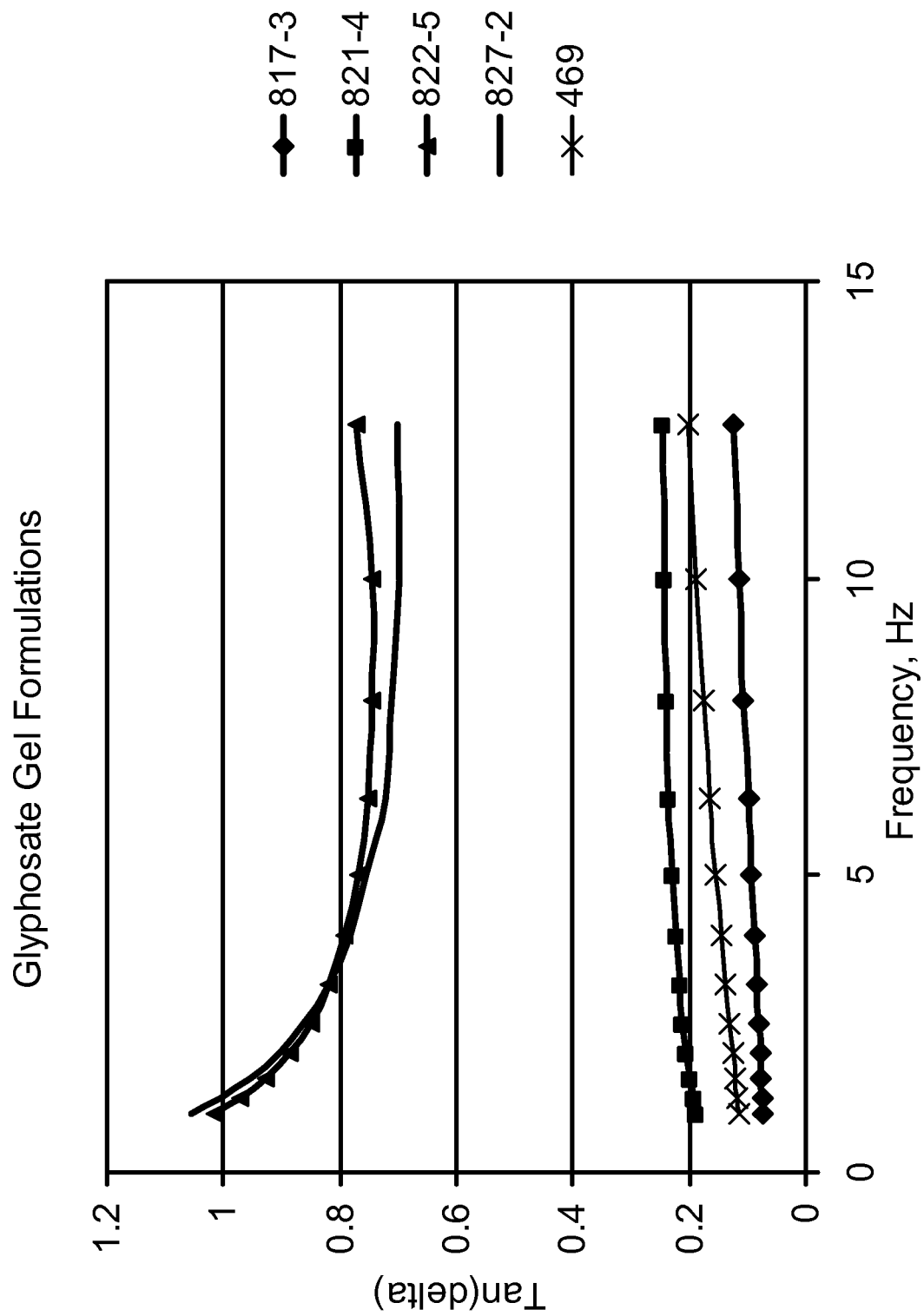
FIG. 7 is a graph depicting tan (delta) for glyphosate gel compositions of the present invention as a function of oscillation frequency sweep at 1% strain. The data were obtained according to the method described in Example 1.

Tan delta measurements for Table II formulations 817-3, 821-4, 822-5, 827-2 and 469 were measured using a TA rheometer with a 60 mm 2° acrylic cone and plate at 20° C. at 1% strain. Results are provided in Table 1d and are depicted in FIG. 7.

TABLE 1d

Tan Delta

| Freq.(Hz) | 817-3 | 821-4 | 822-5 | 827-2 | 469 |
|---|---|---|---|---|---|
| 1 | 0.0748 | 0.1884 | 1.015 | 1.054 | 0.116 |
| 1.259 | 0.0751 | 0.1934 | 0.9706 | 1.004 | 0.1184 |
| 1.585 | 0.0766 | 0.1988 | 0.9284 | 0.9541 | 0.1212 |
| 1.995 | 0.0782 | 0.205 | 0.885 | 0.9045 | 0.1251 |
| 2.512 | 0.0811 | 0.2115 | 0.8504 | 0.8619 | 0.1308 |
| 3.163 | 0.084 | 0.2174 | 0.8183 | 0.8185 | 0.1366 |
| 3.982 | 0.0884 | 0.224 | 0.7922 | 0.7814 | 0.1444 |
| 5.011 | 0.0932 | 0.2296 | 0.7696 | 0.7537 | 0.1538 |
| 6.311 | 0.09875 | 0.2358 | 0.7532 | 0.7228 | 0.1636 |
| 7.944 | 0.1067 | 0.2399 | 0.7444 | 0.71 | 0.1752 |
| 9.997 | 0.1149 | 0.2434 | 0.7463 | 0.6994 | 0.1886 |
| 12.59 | 0.1244 | 0.2445 | 0.7703 | 0.7024 | 0.2034 |

Figure 8:
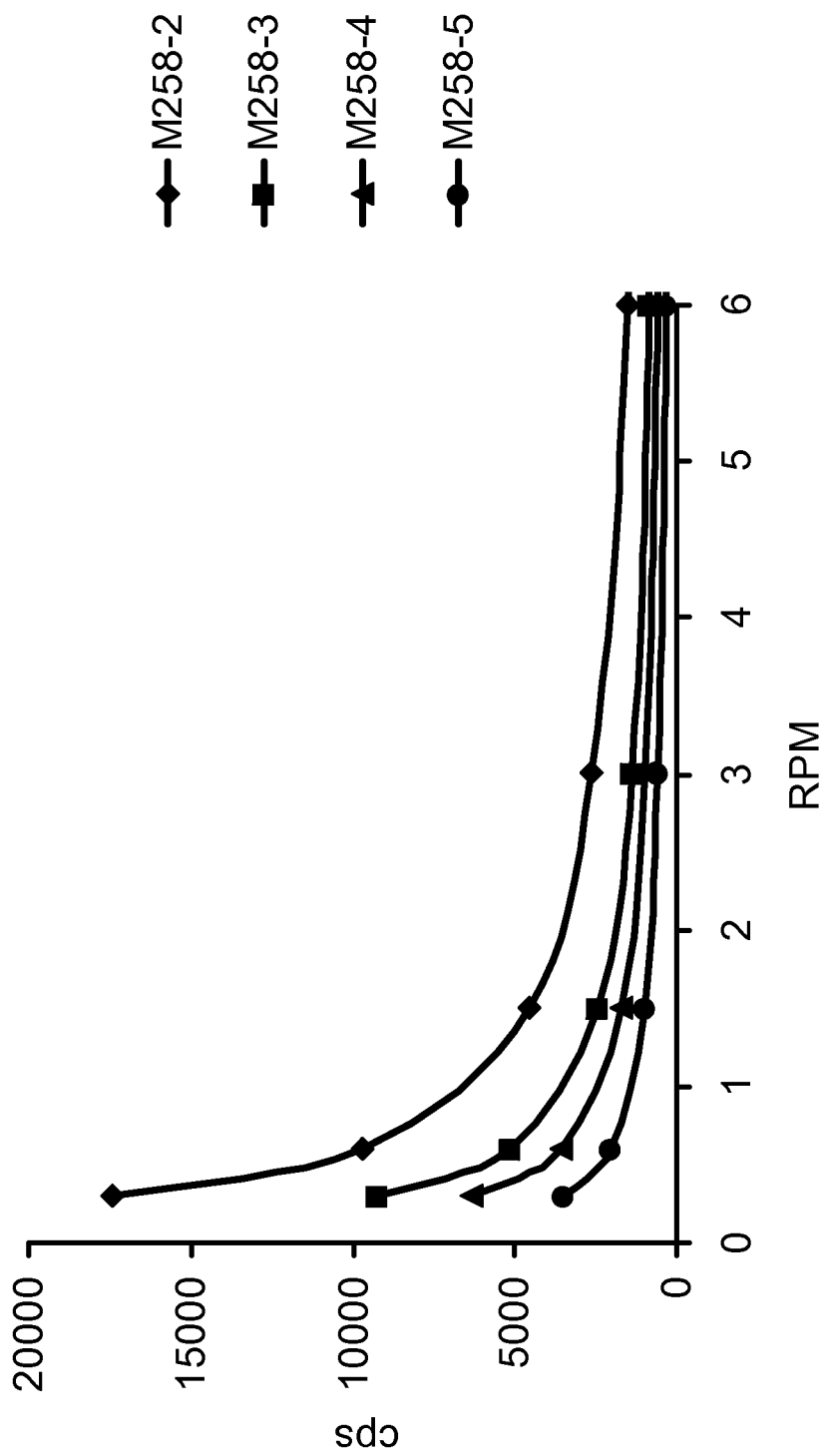
FIG. 8 is a graph depicting the viscosity of glyphosate gel compositions of the present invention as a function of Brookfield DV-II viscometer #3 spindle RPM as measured at 25° C. The data were obtained according to the method described in Example 1.

The formulations in Table 1e were prepared by the method used to prepare the Table II formulations. The viscosity of the Table 1e formulations were measured on a Brookfield DV-II viscometer at 25° C. using the spindle as indicated with the results in cP reported in Table 1f and are depicted in FIG. 8.

TABLE 1e

| Form. | Carbopol Aqua 30 (% by wt) | 45% KOH (% by wt) | Proxel GXL (% by wt) | SAG 1572 (% by wt) | pH |
|---|---|---|---|---|---|
| M258-2 | 3.0 | 1.88 | 0.1 | 0.01 | 7 |
| M258-3 | 2.5 | 1.75 | 0.1 | 0.01 | 7.5-8 |
| M258-4 | 2.0 | 1.18 | 0.1 | 0.01 | 7 |
| M258-5 | 1.5 | 1.10 | 0.1 | 0.01 | 7 |

TABLE 1f

Viscosity Tests on Brookfield DV-II Viscometer

| | Spindle | | | |
|---|---|---|---|---|
| Form. | #3 M258-2 | #3 M258-3 | #3 M258-4 | #2 M258-5 |
| 0.3 RPM | 17400 | 9250 | 6350 | 3510 |
| 0.6 RPM | 9700 | 5130 | 3550 | 2040 |
| 1.5 RPM | 4560 | 2440 | 1690 | 960 |
| 3 RPM | 2640 | 1410 | 979 | 570 |
| 6 RPM | 1540 | 843 | 585 | 340 |
| 12 RPM | 783 | 503 | 345 | 207 |
| 30 RPM | 312 | 262 | 180 | 110 |
| 60 RPM | 157 | 157 | 111 | 63 |

Yield point and viscosity data were measured for the formulations in Table IV that contained a gelling agent, a commercially available gel composition (Speed Stick Gel by Mennen, available from Colgate-Palmolive), and a formulation containing no glyphosate (identified as 3% carbopol gel). The formulations in Table 1g were prepared by the method used to prepared the Table II formulations. The values were determined using the TA rheometer with the cone and plate geometry and viscosity was measured as a function of shear rate. The resulting curve was then fitted with Bingham rheological model, and yield point and viscosity were calculated based on these curves. In the Bingham rheological model, a fluid is presumed not to flow until an applied shear stress, T, exceeds a minimum value, $\tau_0$. This minimum value of shear stress is known as the "yield point" (YP). At stress levels above the YP, changes in shear stress become proportional to the changes in the shear rate. The proportionality constant is known as the plastic viscosity (PV), represented in the equation below as γ. The Bingham Plastic model can be represented by the following expression:

$$\tau = \tau_0 + \mu_B \gamma$$

wherein γ is the proportionality constant, also known as the plastic viscosity (PV) and $\mu_B$ is the constant Bingham viscosity. The data is provided in Table 1g.

TABLE 1g

| Sample | Yield Pt (dyne/cm2) | Viscosity (poise) | AE Loading |
|---|---|---|---|
| N482-5 | 255.3 | 99.5 | 0.51 |
| N482-4 | 281.3 | 117.9 | 0.74 |
| N482-1 | 231.9 | 106.3 | 1 |
| N485-1 | 240 | 90.12 | 0.51 |
| N479-2 | 256.6 | 123.7 | 0.75 |
| N479-3 | 195.6 | 108.5 | 1 |
| N485-4 | 219.5 | 176.8 | 0.51 |
| N485-3 | 249.1 | 156.2 | 0.75 |
| N485-2 | 185.7 | 150.5 | 1 |
| N485-5 | 178.3 | 131.7 | 0.75 |
| N485-6 | 146 | 90.25 | 0.75 |

TABLE 1g-continued

| Sample | Yield Pt (dyne/cm2) | Viscosity (poise) | AE Loading |
|---|---|---|---|
| N485-7 | 167.2 | 88.17 | 0.75 |
| N485-8 | 64.87 | 55.4 | 0.75 |
| Mennen gel | 77 | 228.5 | 0 |
| 3% carbopol gel | 175.9 | 116.9 | 0 |
| N482-2 | 192 | 95.87 | 1 |
| N482-3 | 244.6 | 107 | 1 |

These data demonstrate that to be most useful, the gel must have rheological properties such that it is elastic in nature or have a value of tan delta less than 1 (tan δ<1). This elastic nature is important because with a high elasticity the gel will be retained on the leaf and not spread and run off of the site where it is applied as a gel that is more viscous than elastic in nature will do. The calculated yield points for the gels in Table IV range from 176 to 281 dyne/cm$^2$ and support the low run-off potential of the gel when applied to leaf surface.

Example 2

An experiment was performed to determine the efficacy of experimental gel application mixtures relative to a comparative application mixture not containing a gelling agent (M737). Formulations from Table IV were applied using a standard deodorant gel applicator used in personal care industry to TAROF (flowering stage 6 in diameter), FESAR (tillering stage 3-4 in tall), and PLAMA (4-6 in diameter) in field tests to assess weed control efficacy. Approximately 1.1 grams of each gel was applied to each individual weed and spread over the entire leaf surface. Table 2a indicates the estimated glyphosate application rate applied to each plant on a g a.e./weed basis and a kg a.e./ha basis where "Trt." refers to treatment number, "Form." refers to formulation number, "TAROF" refers to common dandelion, "FESAR" refers to tall fescue and "PLAMA" refers to broadleaf plantain. The calculations were based on a TAROF area of 182.5 cm$^2$, a FESAR area of 96.8 cm$^2$ and a PLAMA area of 81.3 cm$^2$.

TABLE 2a

| Trt. | Form. | glyphosate a.e./weed | TAROF kg a.e./ha | FESAR kg a.e./ha | PLAMA kg a.e./ha |
|---|---|---|---|---|---|
| 1 | N482-5 | 0.0056 | 3.06 | 5.80 | 6.89 |
| 2 | N482-4 | 0.0081 | 4.43 | 8.38 | 9.96 |
| 3 | N482-1 | 0.011 | 6.01 | 11.38 | 13.53 |
| 4 | N485-1 | 0.0056 | 3.06 | 5.80 | 6.89 |
| 5 | N479-2 | 0.0083 | 4.53 | 8.59 | 10.21 |
| 6 | N479-3 | 0.011 | 6.01 | 11.38 | 13.53 |
| 7 | N485-4 | 0.0056 | 3.06 | 5.80 | 6.89 |
| 8 | N485-3 | 0.0083 | 4.53 | 8.59 | 10.21 |
| 9 | N485-2 | 0.011 | 6.01 | 11.38 | 13.53 |
| 10 | N485-5 | 0.0083 | 4.53 | 8.59 | 10.21 |
| 11 | N485-6 | 0.0083 | 4.53 | 8.59 | 10.21 |
| 12 | N485-7 | 0.0083 | 4.53 | 8.59 | 10.21 |
| 13 | N485-8 | 0.0083 | 4.53 | 8.59 | 10.21 |
| 14 | M737 | 0.0108 | 5.90 | 11.18 | 13.29 |

Injury ratings were taken at 1, 3, 7 and 15 days after treatment (DAT) and the data is reported in Tables 2b, 2c, 2d, and 2e, respectively. Plant injury was determined as a percentage as compared to untreated plants following a standard procedure wherein a visual assessment of plant mortality and growth reduction is made by one skilled in the art specially trained to make such assessments.

TABLE 2b

| | % Control 1 DAT | | |
|---|---|---|---|
| Form. | TAROF | FESAR | PLAMA |
| N479-2 | 0.0 | 0.0 | 0.0 |
| N479-3 | 0.0 | 0.0 | 0.0 |
| N482-1 | 0.0 | 0.0 | 0.0 |
| N482-4 | 0.0 | 0.0 | 0.0 |
| N482-5 | 0.0 | 0.0 | 0.0 |
| N485-1 | 0.0 | 0.0 | 0.0 |
| N485-2 | 0.0 | 0.0 | 0.0 |
| N485-3 | 0.0 | 0.0 | 0.0 |
| N485-4 | 0.0 | 0.0 | 0.0 |
| N485-5 | 0.0 | 0.0 | 0.0 |
| N485-6 | 13.3 | 33.3 | 25.0 |
| N485-7 | 13.3 | 50.0 | 20.0 |
| N485-8 | 28.3 | 73.3 | 21.7 |
| M737 | 21.7 | 30.0 | 20.0 |

TABLE 2c

| | % Control 3 DAT | | |
|---|---|---|---|
| Form. | TAROF | FESAR | PLAMA |
| N479-2 | 23.3 | 53.3 | 60.0 |
| N479-3 | 36.7 | 55.0 | 50.0 |
| N482-1 | 30.0 | 48.3 | 58.3 |
| N482-4 | 23.3 | 53.3 | 56.7 |
| N482-5 | 45.0 | 30.0 | 68.3 |
| N485-1 | 43.3 | 45.0 | 36.7 |
| N485-2 | 30.0 | 63.3 | 45.0 |
| N485-3 | 40.0 | 60.0 | 30.0 |
| N485-4 | 30.0 | 56.7 | 30.0 |
| N485-5 | 33.0 | 70.0 | 40.0 |
| N485-6 | 55.0 | 76.7 | 55.0 |
| N485-7 | 63.3 | 80.0 | 46.7 |
| N485-8 | 60.0 | 80.0 | 56.7 |
| M737 | 53.3 | 70.0 | 25.0 |

TABLE 2d

| | % Control 7 DAT | | |
|---|---|---|---|
| Form. | TAROF | FESAR | PLAMA |
| N479-2 | 86.3 | 100.0 | 98.0 |
| N479-3 | 85.3 | 99.7 | 96.7 |
| N482-1 | 85.3 | 100.0 | 96.7 |
| N482-4 | 80.7 | 95.7 | 96.0 |
| N482-5 | 92.0 | 93.0 | 89.3 |
| N485-1 | 88.3 | 97.3 | 94.0 |
| N485-2 | 84.0 | 100.0 | 100.0 |
| N485-3 | 84.7 | 88.3 | 98.0 |
| N485-4 | 88.0 | 100.0 | 98.7 |
| N485-5 | 82.3 | 100.0 | 92.7 |
| N485-6 | 86.7 | 100.0 | 93.3 |
| N485-7 | 82.7 | 100.0 | 96.0 |
| N485-8 | 80.7 | 92.7 | 95.2 |
| M737 | 80.3 | 89.7 | 100.0 |

TABLE 2e

| | % Control 15 DAT | | |
|---|---|---|---|
| Form. | TAROF | FESAR | PLAMA |
| N479-2 | 94.7 | 96.7 | 100.0 |
| N479-3 | 94.7 | 100.0 | 100.0 |
| N482-1 | 93.3 | 96.0 | 100.0 |
| N482-4 | 90.7 | 98.3 | 96.7 |
| N482-5 | 94.7 | 100.0 | 100.0 |
| N485-1 | 91.7 | 98.3 | 100.0 |

TABLE 2e-continued

| | % Control 15 DAT | | |
|---|---|---|---|
| Form. | TAROF | FESAR | PLAMA |
| N485-2 | 100.0 | 100.0 | 100.0 |
| N485-3 | 90.7 | 100.0 | 100.0 |
| N485-4 | 91.3 | 100.0 | 100.0 |
| N485-5 | 97.3 | 96.7 | 100.0 |
| N485-6 | 94.7 | 100.0 | 100.0 |
| N485-7 | 93.3 | 100.0 | 100.0 |
| N485-8 | 91.3 | 96.7 | 100.0 |
| M737 | 88.0 | 100.0 | 100.0 |

The field efficacy of formulation 258 was evaluated. Formulation M258 mixtures were applied at different rates to field of common dandelion (TAROF), perennial ryegrass (LOLPE), and broadleaf plantain (PLAMA) using a Mennen gel applicator, as described above. Injury ratings were taken at 6, 13, 22, and 34 days after treatment. The data is provided in Tables 2f-2i, respectively.

TABLE 2f

| | Gel Rate | Gly a.i. Rate | % Control 6 DAT | | |
|---|---|---|---|---|---|
| Form | g/weed | g/weed | TAROF | LOLPE | PLAMA |
| M258 | 0.7 | 0.007 | 46.7 | 95.3 | 66.7 |
| M258 | 1.8 | 0.018 | 58.3 | 99.3 | 77.7 |
| M258 | 2.8 | 0.028 | 71.7 | 100.0 | 83.3 |

TABLE 2g

| | Gel Rate | Gly a.i. Rate | % Control 13 DAT | | |
|---|---|---|---|---|---|
| Form | g/weed | g/weed | TAROF | LOLPE | PLAMA |
| M258 | 0.7 | 0.007 | 60.0 | 100.0 | 76.0 |
| M258 | 1.8 | 0.018 | 70.0 | 100.0 | 91.3 |
| M258 | 2.8 | 0.028 | 82.7 | 100.0 | 93.3 |

TABLE 2h

| | Gel Rate | Gly a.i. Rate | % Control 22 DAT | | |
|---|---|---|---|---|---|
| Form | g/weed | g/weed | TAROF | LOLPE | PLAMA |
| M258 | 0.7 | 0.007 | 72.7 | 100.0 | 90.0 |
| M258 | 1.8 | 0.018 | 81.3 | 100.0 | 100.0 |
| M258 | 2.8 | 0.028 | 93.0 | 100.0 | 100.0 |

TABLE 2i

| | Gel Rate | Gly a.e. Rate | % Control 34 DAT | | |
|---|---|---|---|---|---|
| Form | g/weed | g/weed | TAROF | LOLPE | PLAMA |
| M258 | 0.7 | 0.007 | 85.0 | 100.0 | 90.0 |
| M258 | 1.8 | 0.018 | 95.3 | 100.0 | 100.0 |
| M258 | 2.8 | 0.028 | 99.3 | 100.0 | 100.0 |

The field efficacy of additional gel mixtures prepared from Table II and Table III 26 mL of each gel formulations were applied by placing 26 ml of gel onto a sponge and wiping over the treated area to dandelion (TAROF), yellow nutsedge (CYPES), and broadleaf plantain (PLAMA). Injury ratings were taken at 1, 4, 7, and 13 days after treatment. The data is provided in Tables 2j-2m, respectively.

TABLE 2j

| | % Control 1 DAT | | | |
|---|---|---|---|---|
| Form | TAROF | CYPES | PLAMA | FESAW |
| M261 | 28.3 | 10.0 | 22.5 | 66.7 |
| M262 | 50.0 | 10.0 | 20.0 | 65.0 |
| M257 | 1.7 | 1.7 | 1.7 | 0 |
| M258 | 0.0 | 0.0 | 0.0 | 0 |
| CONTROL | 0.0 | 0.0 | 0.0 | 0 |

TABLE 2k

| | % Control 4 DAT | | | |
|---|---|---|---|---|
| Form | TAROF | CYPES | PLAMA | FESAW |
| M261 | 66.7 | 48.3 | 55 | 83.7 |
| M262 | 68.3 | 30 | 33 | 85.3 |
| M257 | 35.0 | 28.3 | 30 | 48.3 |
| M258 | 45.0 | 27.5 | 28.3 | 31.7 |
| CONTROL | 0.0 | 0.0 | 0.0 | 0 |

TABLE 2l

| | % Control 7 DAT | | | |
|---|---|---|---|---|
| Form | TAROF | CYPES | PLAMA | FESAW |
| M261 | 85.0 | 63.3 | 65.0 | 94.0 |
| M262 | 83.3 | 56.7 | 70.0 | 92.0 |
| M257 | 81.7 | 58.3 | 73.3 | 87.3 |
| M258 | 80.0 | 62.5 | 73.3 | 86.7 |
| CONTROL | 0.0 | 0.0 | 0.0 | 0 |

TABLE 2m

| | % Control 13 DAT | | | |
|---|---|---|---|---|
| Form | TAROF | CYPES | PLAMA | FESAW |
| M261 | 90.0 | 97.7 | 100.0 | 100 |
| M262 | 85.0 | 98.7 | 98.3 | 100 |
| M257 | 90.0 | 97.0 | 95.0 | 100 |
| M258 | 87.7 | 99.0 | 98.3 | 99.3 |
| CONTROL | 0.0 | 0.0 | 0.0 | 0 |

Gel formulations from Table III were sprayed with a trigger sprayer at a spray volume of approximately 1349 L/hectare to a typical lawn and garden weed spectrum in a greenhouse setting. The weed spectrum consisted of hairy crabgrass (DIGSA), tall fescue (FESAR), common purslane (POROL), white clover (TRFRE). Injury ratings were taken at 5 and 14 DAT. Gel formulations were compared to commercial formulation, Roundup Super Concentrate ("RU SC"). The results are reported in Tables 2n and 2o.

TABLE 2n

| | % Control 5 DAT | | | |
|---|---|---|---|---|
| Form | DIGSA | FESAR | POROL | TRFRE |
| RU SC (2.5 oz/gal) | 65.0 | 73.3 | 85.0 | 83.3 |
| RU SC (0.09% ai) | 40.0 | 38.3 | 40.0 | 55.5 |
| RU SC (0.26% ai) | 51.7 | 53.3 | 73.3 | 65.0 |
| RU SC (0.5% ai) | 63.3 | 71.7 | 94.3 | 68.3 |
| RU SC (0.75% ai) | 60.0 | 68.3 | 96.0 | 88.3 |
| N893B | 51.7 | 40.0 | 48.3 | 58.3 |
| N893C | 50.0 | 45.0 | 58.3 | 63.3 |
| N894A | 55.0 | 45.0 | 79.3 | 70.0 |
| N894B | 66.7 | 81.7 | 75.0 | 97.0 |

TABLE 2o

| | % Control 14 DAT | | | |
|---|---|---|---|---|
| Form | DIGSA | FESAR | POROL | TRFRE |
| RU SC (2.5 oz/gal) | 100.0 | 100.0 | 100.0 | 100.0 |
| RU SC (0.09% ai) | 65.0 | 90.0 | 83.3 | 71.7 |
| RU SC (0.26% ai) | 98.0 | 98.7 | 97.0 | 91.7 |
| RU SC (0.5% ai) | 100.0 | 100.0 | 100.0 | 98.0 |
| RU SC (0.75% ai) | 100.0 | 100.0 | 100.0 | 99.7 |
| N893B | 70.0 | 90.3 | 90.3 | 77.7 |
| N893C | 81.7 | 97.7 | 99.0 | 85.3 |
| N894A | 91.7 | 99.3 | 100.0 | 91.0 |
| N894B | 100.0 | 100.0 | 100.0 | 100.0 |

The Data in Tables 2a-d demonstrate the gel formulations with pelargonic acid show equivalent fast developing symptoms to the liquid formulation at 1 DAT and equal control at 15 DAT. The data in tables 2 e-h demonstrate that with as little as 0.7 g of gel per weed 85% and above control of the weeds is obtained and with 1.8 and 2.8 g of gel per weed≥95% control is achieved. The data in table 2n and 2o demonstrate that the gel formulations provide equivalent control to a liquid formulation when applied at the same rate through a trigger sprayer.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements. In view of the above, it will be seen that the several objects of the invention are achieved and other advantageous results attained.

As various changes could be made in the above compositions and processes without departing from the scope of the invention, it is intended that all matter contained in the above description and shown in the accompanying drawing[s] shall be interpreted as illustrative and not in a limiting sense.

What is claimed is:

1. An aqueous agrochemical gel composition comprising:
   (1) from 0.1 to 5 percent by weight on an acid equivalent basis, relative to the total composition, of a water-soluble agrochemical component comprising glyphosate in the form of a salt thereof,
   (2) from 1 to 5 percent by weight, relative to the total composition, of a polymeric gel forming agent component comprising at least one polymeric gel forming agent selected from the group consisting of polyacrylic acids and salts, derivatives, and copolymers thereof, and
   (3) from 90 to 98 percent by weight, relative to the total composition, of water;
   wherein tan(delta) of the gel composition is less than 0.7 as measured by oscillation frequency sweep rheometric measurements between about 0.1 and about 600 rad/sec at 0.2 Pa and 1 Pa as measured using a cone and plate viscometer method with a 60 mm 2° acrylic cone and plate at 20° C., and wherein the yield point of the gel composition is at least about 50 dyne/cm².

2. The gel composition of claim 1 wherein the yield point is from about 50 to about 400 dyne/cm².

3. The gel composition of claim 1 wherein tan(delta) of the gel composition is from 0.05 to 0.7.

4. The gel composition of claim 1 wherein the stationary viscosity of the gel composition is from about 500 to 150,000 mPa second as measured according to a cone and plate viscometer method using a 60 mm 2° acrylic cone and plate at 20° C. with an oscillating frequency of 100 rad/s.

5. The gel composition of claim 1 wherein the water content is from 94 to 98 percent by weight, relative to the total composition.

6. The gel composition of claim 1 wherein the water-soluble agrochemical content is from 0.5 to 5 percent by weight on an acid equivalent basis, relative to the total composition.

7. The gel composition of claim 1 wherein the polymeric gel forming agent content is from 2 to 5 percent by weight, relative to the total composition.

8. The gel composition of claim 1 further comprising a preservative.

9. The gel composition of claim 1 further comprising a surfactant component comprising at least one surfactant.

10. The gel composition of claim 9 wherein the surfactant component comprises at least one surfactant selected from the group consisting of alkoxylated tertiary etheramine, alkoxylated quaternary etheramine, alkoxylated tertiary amine oxide, alkoxylated tertiary amine, alkoxylated quaternary amine, alkoxylated etheramine oxide, polyamine, sulfate derivative, sulfonate derivative, phosphate ester of alkoxylated alcohol, alkyl polysaccharide, alkoxylated alcohol, amidoalkylamine, and combinations thereof.

11. The gel composition of claim 1 wherein the water-soluble agrochemical component further comprises a water-soluble co-herbicide selected from the group consisting of 2,4-D, dicamba, MCPA, MCPB, triclopyr, imazamethabenz-m, imazamox, imazapic, imazapyr, imazaquin, imazethapyr, paraquat, diquat, and salts and esters thereof.

12. The gel composition of claim 1 further comprising at least one water-insoluble agrochemical dispersed therein selected from dithiopyr, pyraflufen-ethyl, acifluorfen, aclonifen, bifenox, chlomethoxyfen, chlornitrofen, etnipromid, fluorodifen, fluoroglycofen, fluoronitrofen, fomesafen, furyloxyfen, halosafen, lactofen, nitrofen, nitrofluorfen, oxyfluorfen and atrazine.

13. The gel composition of claim 1 consisting essentially of at least one water-soluble agrochemical, at least one polymeric gel forming agent, a preservative and water.

14. The gel composition of claim 1 comprising from 0.5 to 1.5 percent by weight, relative to the total composition, of a water-soluble agrochemical on an acid equivalent basis, from 2 to 4 percent by weight, relative to the total composition, of a polymeric gel forming agent, and from 94 to 97.5 percent by weight, relative to the total composition, of water.

15. A method for confined application of an agrochemical to plants, the method comprising applying the agrochemical gel composition of claim 1 to the plants.

16. The method of claim 15 wherein the agrochemical gel composition is applied to the foliage of the plants with a hand-held sprayer, a roller or a brush.

17. A method of confined application of a water-soluble herbicide to unwanted plants, the method comprising applying the agrochemical gel composition of claim 14 to the unwanted plants.

18. The gel composition of claim 1 further comprising at least one water-insoluble agrochemical dispersed therein.

19. The gel composition of claim 1 further comprising pelargonic acid or an agronomically acceptable salt thereof.

20. The gel composition of claim 1 wherein the yield point is from about 100 to about 400 dyne/cm².

21. The gel composition of claim 1 wherein the yield point is from about 100 to about 300 dyne/cm².

22. The gel composition of claim 1 wherein tan(delta) of the gel composition is from 0.05 to 0.6.

23. The gel composition of claim 1 wherein tan(delta) of the gel composition is from 0.05 to 0.5.

24. The gel composition of claim 1 wherein tan(delta) of the gel composition is from 0.05 to 0.4.

25. An aqueous agrochemical gel composition comprising:
   (1) from 0.1 to 5 percent by weight on an acid equivalent basis, relative to the total composition, of a water-soluble agrochemical component comprising glyphosate in the form of a salt thereof,
   (2) from 1 to 5 percent by weight, relative to the total composition, of a polymeric gel forming agent component comprising at least one polyacrylic acid, or a salt or derivative thereof, and
   (3) from 90 to 98 percent by weight, relative to the total composition, of water;
   wherein tan(delta) of the gel composition is from 0.05 to 0.3 as measured by oscillation frequency sweep rheometric measurements between about 0.1 and about 600 rad/sec at 0.2 Pa and 1 Pa as measured using a cone and plate viscometer method with a 60 mm 2° acrylic cone and plate at 20° C., and wherein the yield point of the gel composition is at least about 200 dyne/cm².

26. The gel composition of claim 25 wherein the yield point is from about 200 to about 400 dyne/cm².

27. The gel composition of claim 1 wherein the polymeric gel forming agent component is selected from polyacrylic acids, polyacrylamides, polyacrylates, and mixtures and copolymers thereof.

28. The gel composition of claim 25 wherein the polymeric gel forming agent component is selected from polyacrylic acids, polyacrylamides, polyacrylates, and mixtures and copolymers thereof.

29. An aqueous agrochemical gel composition comprising:
   (1) from 0.1 to 5 percent by weight on an acid equivalent basis of a water soluble herbicide component consisting of
      (a) at least one salt of glyphosate, and
      (b) optionally, one or more additional herbicides selected from the group consisting of 2,4-D, dicamba, MCPA, MCPB, triclopyr, diquat, paraquat, agronomically acceptable $C_8$ to $C_{12}$ fatty acids, and salts and esters thereof,
   (2) from 0.1 to 5 percent by weight of a polymeric gel forming agent component comprising at least one polymeric gel forming agent selected from the group consisting of polyacrylic acids, polyacrylamides, polyacrylates, and mixtures and copolymers thereof, and
   (3) from 90 to 98 percent by weight water wherein tan(delta) of the gel composition is less than 0.7 as measured by oscillation frequency sweep rheometric measurements between about 0.1 and about 600 rad/sec at 0.2 Pa and 1 Pa as measured using a cone and plate viscometer method with a 60 mm 2° acrylic cone and plate at 20° C. and wherein the yield point of the gel composition is at least about 50 dyne/cm².

30. The gel composition of claim 29 wherein the water-soluble herbicide component consists of (1) a salt of glyphosate and (2) pelargonic acid or an agronomically acceptable salt thereof.

31. The gel composition of claim 29 wherein the tan (delta) of the gel composition is from 0.05 to 0.3.

* * * * *